United States Patent [19]
Gaskill et al.

[11] Patent Number: 5,159,713
[45] Date of Patent: Oct. 27, 1992

[54] WATCH PAGER AND WRIST ANTENNA

[75] Inventors: Garold B. Gaskill, Portland; Daniel J. Park; Robert G. Rullman, both of Beaverton; Donald T. Rose, Portland; Joseph F. Stiley, III; Lewis W. Barnum, both of Tigard, all of Oreg.; Don G. Hoff, Tiburon, Calif.

[73] Assignees: Seiko Corp.; Seiko Epson Corp., both of Japan

[21] Appl. No.: 356,630

[22] Filed: May 22, 1989

Related U.S. Application Data

[60] Continuation of Ser. No. 101,137, Sep. 24, 1987, abandoned, which is a division of Ser. No. 802,844, Nov. 12, 1985, Pat. No. 4,713,808.

[51] Int. Cl.$^5$ .................................................. H04B 1/06
[52] U.S. Cl. .................................. 455/344; 455/351; 340/825.44
[58] Field of Search ............... 455/351, 344, 100, 95, 455/89, 274, 269; 343/702, 718, 720, 728, 866; 340/825.44, 825.47, 825.48; 368/47, 52, 53, 55

[56] References Cited

U.S. PATENT DOCUMENTS

| D. 210,462 | 3/1968 | Roberts et al. ............... 455/100 |
|---|---|---|
| 3,032,651 | 5/1962 | Gisiger-Stähl et al. . |
| 3,834,153 | 9/1974 | Yoda et al. ............... 340/825.44 X |
| 3,937,004 | 2/1976 | Natori et al. ............... 340/825.44 X |
| 3,983,483 | 9/1976 | Pando ............... 343/718 X |
| 4,131,855 | 12/1978 | Hamagawa . |
| 4,225,965 | 9/1980 | Baugh ............... 455/351 X |
| 4,315,332 | 2/1982 | Sakami et al. . |
| 4,430,757 | 2/1984 | Szakvary ............... 343/702 X |
| 4,480,253 | 10/1984 | Anderson ............... 340/825.44 X |
| 4,569,598 | 2/1986 | Jacobs . |
| 4,663,624 | 5/1987 | Bui et al. ............... 340/825.44 |
| 4,736,196 | 4/1988 | McMahon et al. ............... 455/100 |

FOREIGN PATENT DOCUMENTS

| 0100639 | 2/1984 | European Pat. Off. . |
|---|---|---|
| 0206102 | 12/1982 | Japan ............... 343/718 |
| 0177036 | 10/1983 | Japan ............... 455/314 |

*Primary Examiner*—Stephen Chin
*Attorney, Agent, or Firm*—Elmer Galbi

[57] ABSTRACT

A wide area paging system is disclosed in which paging messages input to the system in one local area can be broadcast to a receiver in any other local area without necessarily broadcasting the message in all areas. A local area clearinghouse in each area stores resident subscriber data including current location and receiver serial number. This data is used to transfer messages over a data network to the correct clearing-house. The system uses a TDM data protocol. The data is encoded and transmitted at a very high rate (e.g., 19,000 baud) in short packets (256 bits/13 milliseconds) via stereo FM sidebands. Receivers are assigned to receive sequentially numbered time slots matching a portion of their address. The addresses of intended receivers are included in the data packets. Battery-powered receivers are deactivated between packets and reactivated in accordance with the sequential time slot number scheme to receive an incoming packet. Messages longer than a packet are segmented and transmitted in two or more packets, linked together by data contained in the packets. A watch pager used in the system employs a wristband antenna which electromagnetically couples to the user's body. The watch pager displays time, telephone numbers and icons representing common types of paging messages.

3 Claims, 17 Drawing Sheets

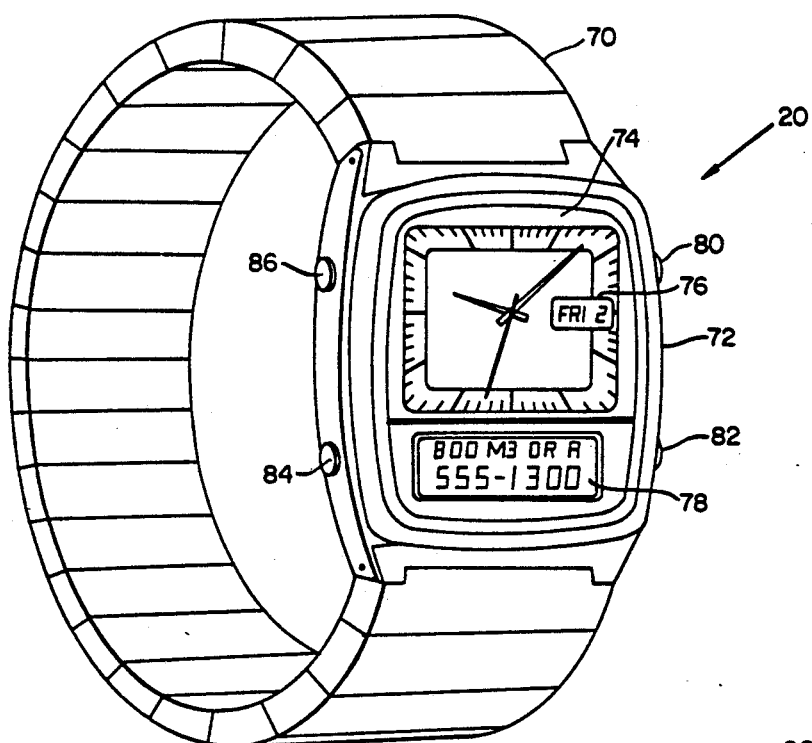
FIG. 1A
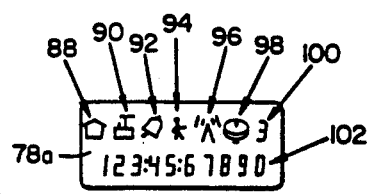
FIG. 1B
FIG. 2B
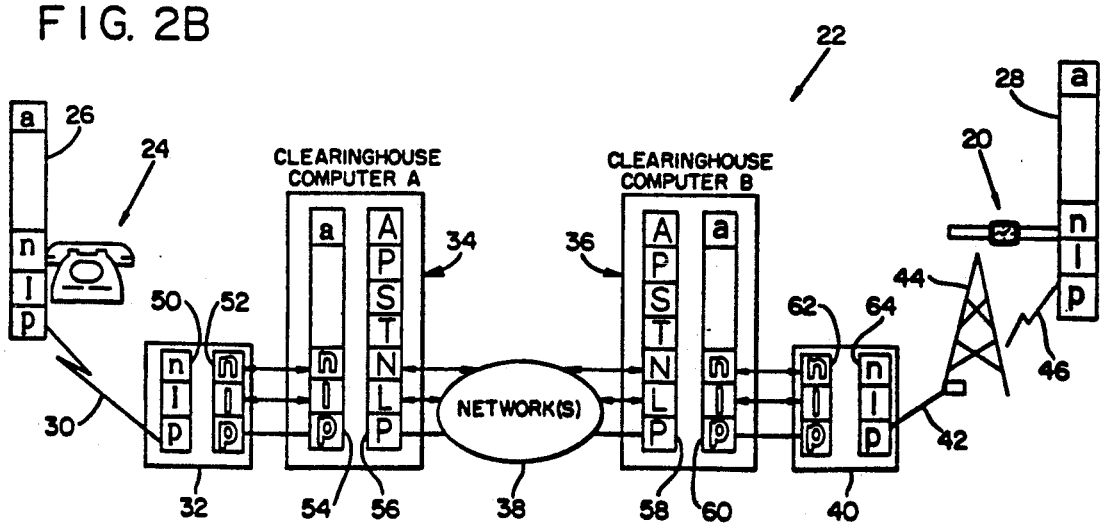

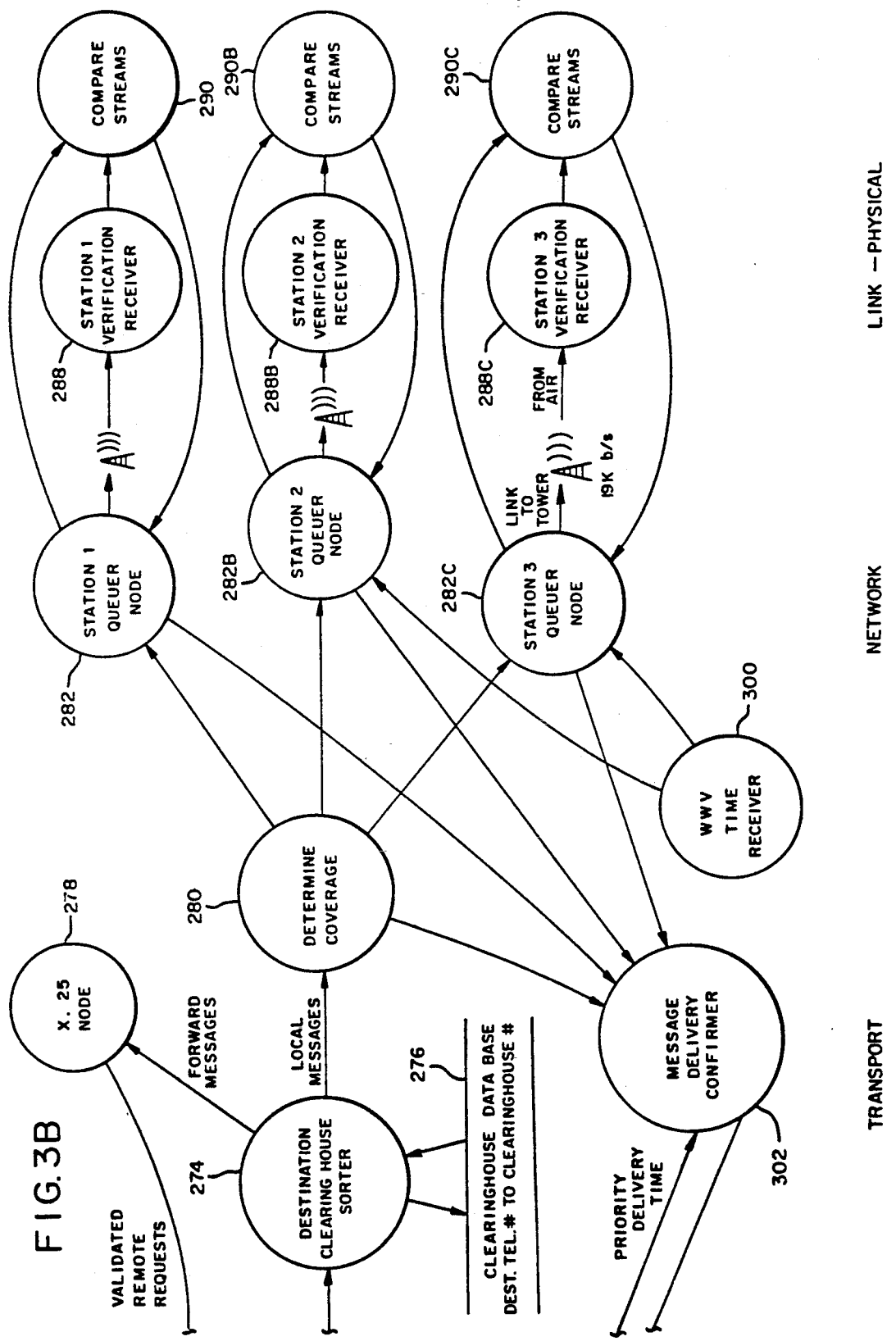

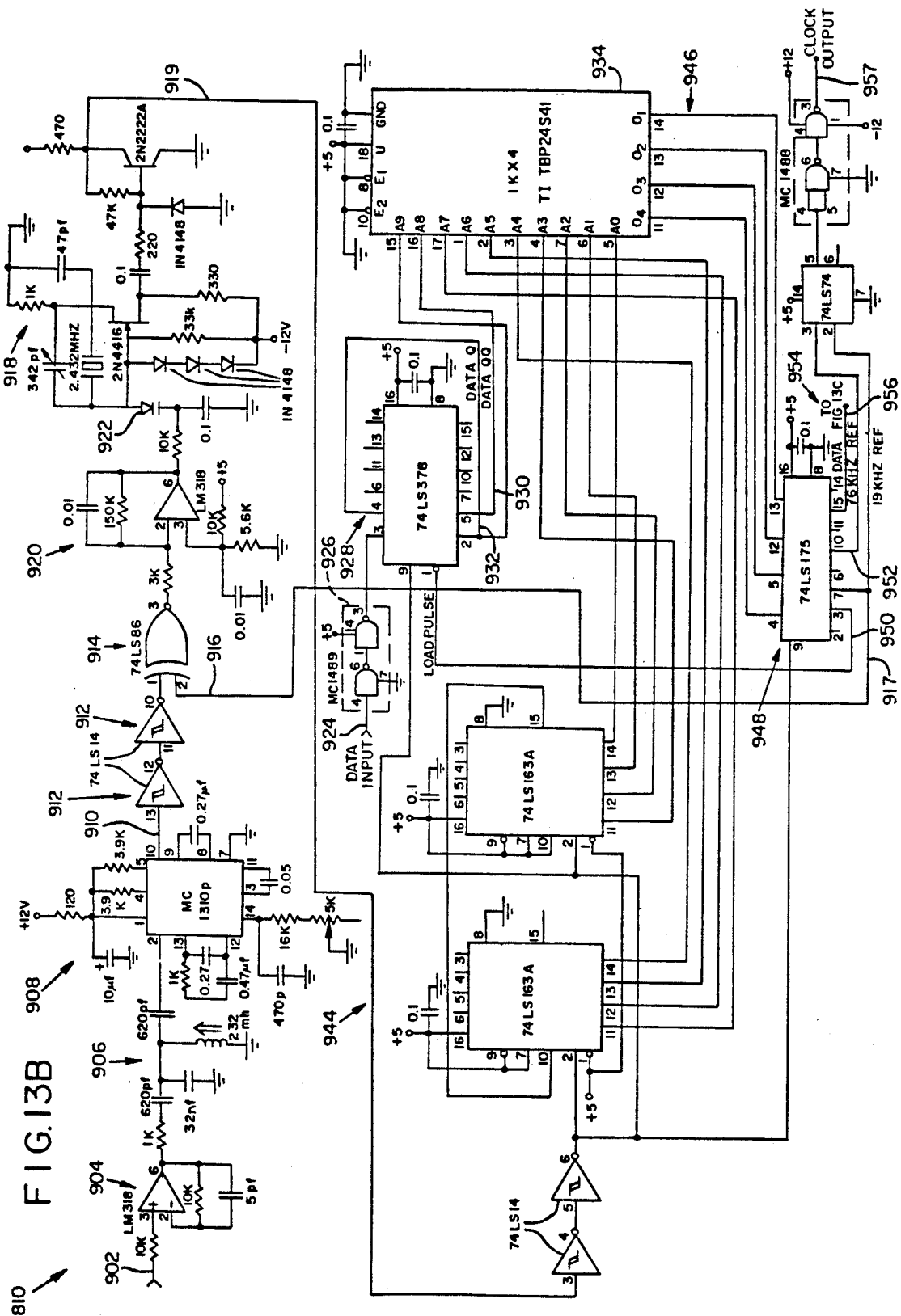

WATCH PAGER AND WRIST ANTENNA

This application is a continuation, of application Ser. No. 07/101,137, filed Sep. 24, 1987, now abandoned which is a division of Ser. No. 06/802,844 filed Nov. 12, 1985 U.S. Pat. No. 4,713,808.

RELATED APPLICATION DATA

The application is related to U.S. patent application Ser. No. 06/678,603, filed Dec. 5, 1984, by Don G. Hoff, entitled PAGER WATCH SYSTEM UTILIZING TIME SLOT COMMUNICATION, assigned to AT&E Systems Incorporated, a wholly-owned subsidiary of the assignee of this application.

BACKGROUND OF THE INVENTION

1. Technical Field

This invention relates to communication systems and receivers and more particularly to wide area paging systems and portable paging receivers with low power consumption and method of data transmission to many receivers on a common channel.

2. Description of Prior Art

Prior paging systems generally provide two categories of coverage. Local area coverage is typically provided by transmitting a page simultaneously from one or more transmitters operating on a single frequency, covering all or a portion of a metropolitan area, to a recipient within the local area. Such coverage is obviously limited to the broadcast range of a local transmitter. Wide area coverage, encompassing several overlapping areas of a large metropolitan area or a number of non-overlapping metropolitan areas, is typically provided by transmitting a paging request to several transmitters via telecommunications and broadcasting the paging message from all transmitters to an intended recipient who may be anywhere within the wide coverage area. The foregoing approach to providing a wide area coverage is expensive and limited to a relatively small number of paging users. As paging traffic increases, the local and wide area coverage users begin to compete for paging channel space. Each wide area user occupies a portion of the available paging channel space for all of the page transmitters within the wide coverage area, displacing local coverage users of the same channel portion from each transmitter. It would be preferable to be able to provide wide area paging coverage without displacing local area coverage users of the same channel portion from all transmitters in the wide area.

Another problem with present paging systems is their incompatibility. Local area coverage users may use one type of paging message encoding scheme for broadcasting a page to a page receiver and wide area coverage users may use a second type. A user who travels frequently must carry different page receivers to receive both types of messages. One solution to the incompatibility is disclosed in U.S. Pat. No. 4,518,961 to Davis et al. Davis et al. describes a single page receiver that stores the encoding schemes for a number of paging systems, encoding schemes such as POCSAG, the paging protocol for the British Post Office, and GGC, a paging protocol designed by Motorola, Inc. This is only a partial solution, however, because the number of encoding schemes greatly exceeds the number the Davis et al. receiver can store.

Prior paging systems have also used various methods for reducing the power consumption of battery-operated portable page receivers to minimize their overall size and to extend their battery life. One approach involves supplying power to receiver circuitry in the page receiver only during a predetermined time slot in which data for the particular page receiver is transmitted. The drawbacks of this approach, however, have been several. First, it is difficult to synchronize accurately the page receiver to the transmitter. Second, long messages that cannot be transmitted in a single time slot require an inordinate amount of time to be completely transmitted to a page receiver. Third, page receivers using this approach have largely relied on a single communications channel, which may not be strong enough in a particular area to transmit successfully to the page receiver. Finally, it has so far proven impractical to implement pagers with miniature batteries because previous pagers do not have low enough power consumption to avoid frequent battery replacement or recharging.

One such prior art paging system is disclosed in U.S. Pat. No. 3,937,004 to Natori et al. The Natori et al. patent describes a page receiver in the form of wristwatch that activates its receiver circuitry periodically for a given time interval to detect a paging signal that may be directed to it. In the particular embodiment given, the receiver is activated five minutes out of a fifteen minute transmission cycle. Although this technique does reduce power consumption, it still requires receiving circuitry to be on one-third of the time.

A battery-saving arrangement for pagers is also disclosed in U.S. Pat. No. 4,398,192 to Moore et al. Page receivers are assigned to groups, and the receivers of each group are activated during a time segment of a transmission cycle set aside for the group. Each receiver within a particular group then is active during the entire group time segment to detect any individually addressed messages for it. The Moore system requires the receiver to be on or energized much longer than is actually necessary to receive a message.

The paging system of U.S. Pat. No. 4,437,095 to Akahori et al. is similar in operation to Moore et al. The Akahori et al. page receiver requires its receiving circuitry to power up periodically to detect a synchronization signal and then again a predetermined time later for group messages. With this approach, the Akahori et al. receiver is able to reduce its power consumption only by about half over continuously-powered receivers.

U.S. Pat. No. 4,383,257 to Giallanza et al. discloses a variation of the previous approach. The receiving circuitry in Giallanza et al. is sequentially activated and deactivated in a periodic duty cycle. It is activated in time to detect a synchronization signal that is transmitted by a transmitter whenever a message is to be sent to a receiver. If a synchronization signal is detected, the receiver remains activated beyond its duty cycle to determine if succeeding address signals identify such receiver to continue receiving messages. This approach also requires the receiving circuitry to be on at least a fixed amount of the time regardless of whether messages are being sent to it. In most cases, this on-time is much longer than is necessary to actually receive the transmitted message.

Synchronizing a receiver to a transmitter by use of a real time signal is known in the prior art, but such apparatus requires the receiver to be continuously on. For example, U.S. Pat. No. 4,358,836 to Tohyama et al. discloses an electronic watch that receives a real time signal from a transmitter to synchronize its internal clock. Similarly, U.S. Pat. No. 4,337,463 to Vangen discloses a time synchronization system for synchronizing clocks at remote stations to a clock at a master station.

U.S. Pat. No. 4,419,765 to Wycoff et al. discloses a power-limited paging receiver that also has frequency scanning capability. If an incoming signal is not detected on a present channel, the receiver can scan over several channels. However, the scanning is done blindly. As a result, this scanning consumes power unnecessarily.

Another drawback of the above devices that use dedicated time slots to receive messages is their limited receiving capability. Messages that cannot be transmitted in a single time slot may require several transmission cycles to complete.

U.S. Pat. No. 4,519,068 to Krebs et al. discloses a method for sending messages of a variable length. Krebs et al. transmits data messages which have several fields, including a sync field to synchronize the receiver to the transmitter and data blocks which follow the sync field. The first channel data block includes the station address. The second channel data block includes an information field that indicates the number of following channel data blocks. Krebs et al., however, is impractical for time division multiplexing because of its format.

In known portable paging receivers, which typically operate in the 150, 200 or 400 megahertz frequency bands, the antenna usually comprises a conductor wrapped around a ferrite bar. This antenna, together with the associated paging receiver, is mounted within a nonconducting enclosure sized to fit in a pocket or clip on a belt. Miniaturization of the enclosure beyond this size is limited by the comparatively bulky ferrite antenna that must be contained.

The pager size problem is further aggravated as the paging frequency is lowered. Lower frequency receivers use larger inductors, capacitors and filters in their frequency dependent circuits. Lower frequency paging is desirable, however, because of its superior radio signal propagation characteristics.

In a paging system marketed by the Telecommunications Group of American Diversified Capital Corp., paging data is believed to be encoded on a 57 kilohertz subcarrier in an FM broadcast signal and transmitted at a rate of 1200 baud. Signal modulation is believed effected by phase modulating the 57 kilohertz carrier. If consecutive data elements are identical, the train of 57 kilohertz cycles repeats without interruption. If, however, the data changes state, i.e., from a 0 to a 1 or 1 to a 0, the phase of the 57 kilohertz subcarrier is suddenly reversed. This is believed effected by doubling the length of the positive going or negative going cycle of the subcarrier, thereby introducing a brief DC component into the subcarrier signal. The phase of the subcarrier is thereafter shifted 180° relative to the previous subcarrier phase.

The American Diversified system suffers from a variety of drawbacks. The slow baud rate limits severely the number of users who can be served effectively and the rate at which information can be transmitted. Additionally, it is known that to try to increase the number of users by increasing baud rate and shortening message length reduces reception reliability. This problem is most apparent when using a mobile RF receiver to receive very high frequencies such as FM. Furthermore, the phase modulation technique employed generates broadband spurious components which must be filtered with elaborate filtering circuits so as to reduce interference with the broadcast audio. These filtering circuits increase the cost and complexity of the modulator unit. Extensive filtering must also be provided in the receiver circuit to separate the desired paging information, modulated around 57 kilohertz, from the broadcast stereo audio, which ends at 53 kilohertz. This again increases the costs and complexity of the system.

Accordingly, a need remains for a versatile, wide-area paging system that overcomes the foregoing and other drawbacks of prior paging systems.

SUMMARY OF THE INVENTION

One object of the invention is to improve upon prior paging systems through increased efficiency, greater usefulness over a wider area, reduced size, lower power consumption and the ability to service a large number of users.

Another object of the invention is to provide a portable electronic paging receiver having the same size, time-keeping accuracy and battery-life characteristics as a conventional electronic wristwatch.

A further object of the invention is to enable paging via a common system of a virtually unlimited number of pager subscribers within any desired area, including local, regional, national, continental, and worldwide communication capability.

An additional object of the invention is to provide such wide area paging coverage without displacing local area access to the paging system.

Still another object of the invention is to enable subscribers in such paging system reliably and efficiently to receive messages of unlimited length and information content.

One aspect of the invention provides a paging system including at least two local area transmitters, each covering a local area of non-overlapping coverage, a plurality of paging receivers assigned to and normally residing in each local area, and means for transferring paging requests from one local area to another area where the intended recipient of the paging request is currently located. Associated with each local area transmitting means are a subscriber storage means for storing a unique identifying address and a current location for each resident page receiver, means for inputting the identifying address for a selected one of the paging receivers, and routing means for routing paging messages to the local transmitter means serving the current location of the intended recipient. The paging messages are routed through a communications network means, in accordance with the stored current location of the selected paging receiver. Thus, a paging message for a paging receiver normally residing in a first local area, but temporarily located in a second local area, is broadcast by the transmitting means serving the second local area. This arrangement leaves the portion of the broadcast channel that would otherwise be allocated to the paging receiver temporarily located in the second local area.

In another aspect of the invention, the paging requests are transmitted from a local area transmitting means to a page receiver in the form of packets, each packet having an address corresponding to a time during which the packet is transmitted. This time is defined as a time slot within a predetermined number of sequentially numbered time slots forming a subframe, and a subframe within a predetermined number of sequentially numbered subframes forming a periodic time frame. Each page receiver has an address also corresponding to a time slot and subframe which controls reception of packets addressed to it. A receiver can also receive packets in time slots normally assigned to other receivers through a method of linking packets to form a chain and joining of chains in a sequence. This method permits use of very short, time slots to send minimal-length messages, and quickly transmit longer messages in packets using available empty time slots.

In a preferred embodiment of the invention, the paging data is phase modulated on subcarriers of two FM stereo broadcast stations, used as the local area transmitters. The modulation is synthesized with a programmable waveform, tailored to minimize spurious modulation products. The paging receiver is constructed in a wristwatch-like unit. The associated antenna is constructed integrally with the watch band and serves to electromagnetically couple the user to the receiver. By this technique, undesirable reception characteristics of the small loop antenna are mitigated. Demodulation in the paging receiver is effected using the stereo pilot signal as a known reference. Data at a rate of 19 kilobaud can be sent by this technique without interfering with the broadcast audio in the FM signal.

The foregoing and additional objects, features and advantages of the present invention will be more readily apparent from the following detailed description of preferred embodiments thereof which proceeds with reference to the accompanying drawings.

BRIEF DESCRIPTION OF DRAWINGS

FIG. 1A is a perspective view of a watch pager according to the present invention.

FIG. 1B is an alternate embodiment of the data display of the pager of FIG. 1A.

FIG. 2B is a simplified open systems interface (OSI) model of the system of FIG. 2A, including the watch pager of FIG. 1A.

FIGS. 3A and 3B are a functional data flow diagram for the local clearinghouse and transmitter facilities portion of the system of FIG. 2A.

FIGS. 13B and 13C are schematics of the subcarrier generator/modulator circuitry of FIG. 13A.

DETAILED DESCRIPTION

1.0 Application Level Description and Operation

1.1 Simplified System Model

Figure 2A:
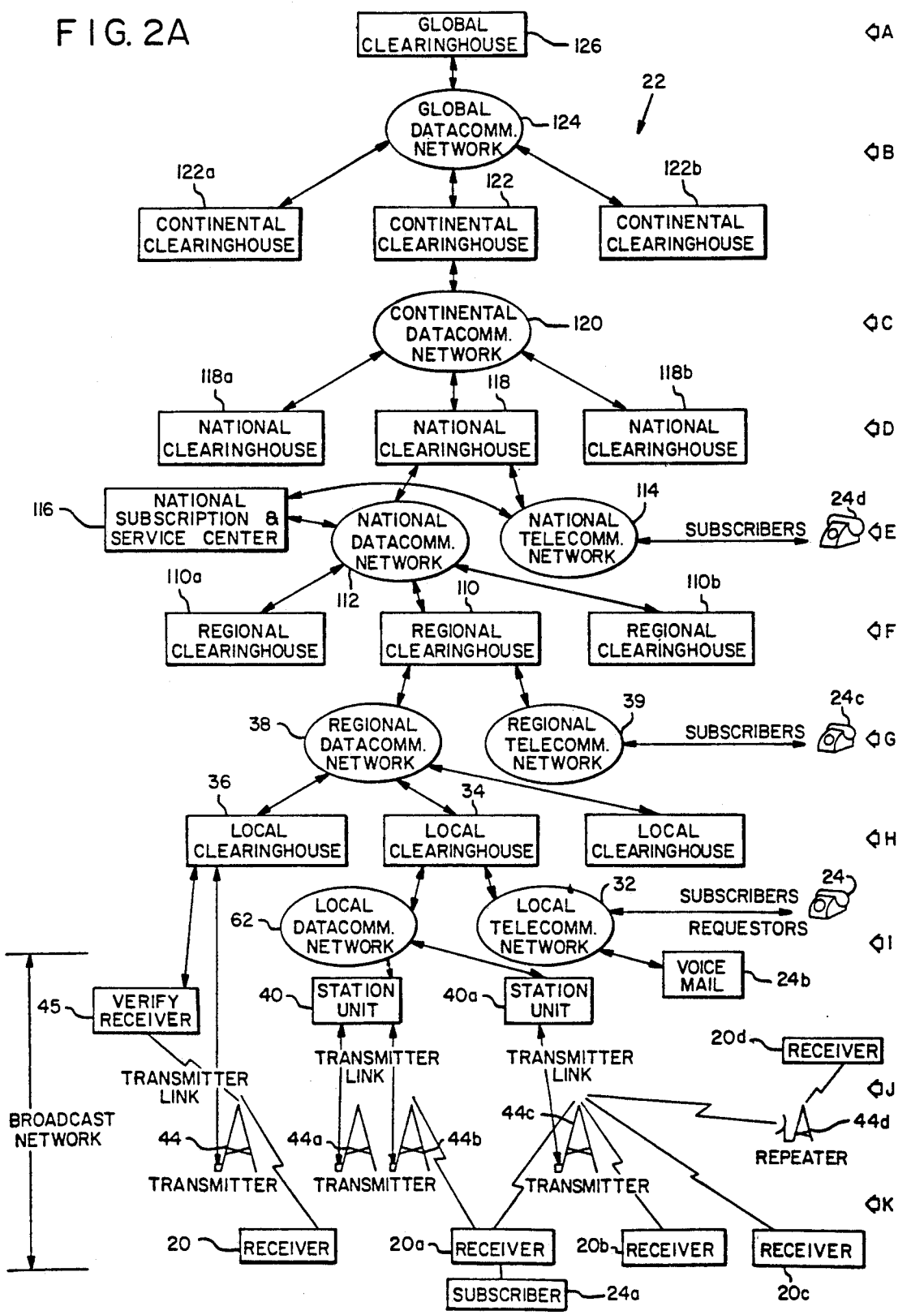
FIG. 2A is a diagram showing a worldwide functional hierarchy of the paging system of the present invention for receiving and transmitting messages to various receivers, including the watch pager of FIG. 1A.

The watch pager 20 of FIG. 1A according to the invention is one of a multitude of receivers in a global paging system 22, shown in FIG. 2A. Before describing the global paging system and its operation, the system is described at the application level, that is, from the perspective of a user of the system.

Referring to FIG. 2B, a simplified open systems interface model of the system of FIG. 2A is shown. There are two users of the system, the wearer of paging watch 20, hereafter referred to as the receiving user, and any person who requests to transmit a page to the receiving user, hereafter referred to as a page requester or sending user. Ordinarily, it is contemplated that a page request will be initiated by means of a Touch-tone telephone 24, although a suitably programmed personal computer connected via modem into system 22 can be used. In the following description, the sending user is assumed to use telephone 24 and the receiving user to employ watch 20.

In the open systems interface (OSI) model, the letters in the blocks represent the layers of the model as follows:

a = application layer
p = presentation layer
s = session layer
t = transport layer
n = network layer
l = link layer
p = physical layer In column 26 adjacent telephone 24, block "a" represents input signals such as dual tone multiple frequency (DTMF) tones that a sending user of the system will enter via telephone 24 and output signals such as voice prompts that such user will receive back from system 22. In column 28 adjacent watch 20, "a" represents the user interface to the watch 20, including various buttons described hereinafter that the receiving user will push to display messages received via system 22. Jagged line 30 represents the telephone connection into system 22.

Block 32 represents the communications interface between the sending user and a first clearinghouse, represented by block 34, which can be called Clearinghouse Computer A. Paging requests transmitted through Clearinghouse Computer A are relayed to a second clearinghouse, represented as Clearinghouse Computer B by block 36, via any of a number of various data communications networks, represented generally by block 38. The paging requests are processed by Clearinghouse Computer B as described hereinafter. The processed requests are then relayed through a communications interface 40, via transmission line 42, to a broadcast transmitter including transmission tower 44 in the locality of the receiving user of watch 20. The tower transmits the paging requests via radio waves 46 to watch 20, which decodes the broadcast messages and displays those intended for the receiving user on the displays of watch 20.

Referring back to block 32, separate input and output columns 50, 52, each containing the letters "n," "l" and "p," represent a possible physical separation between the telephone line interface and Clearinghouse Computer A. In block 34, separate columns 54, 56 represent the input and output sides of Clearinghouse Computer A. Block 36 similarly includes separate input and output columns 58, 60. In communications interface block 40, separate columns 62, 64 denote inputs and outputs, respectively, of a message queuing machine hereafter described which can be physically separated from Clearinghouse Computer B.

Next is a description from the sending user's and receiving user's viewpoints, respectively, of operation of system 22. The internal operation of the system from elements bearing reference numerals 30 through 46 is transparent to both users. As further described hereinafter, paging watch 20 includes an electronic clock. The time on that clock is automatically set to exact local time. When the receiving user travels to a different time zone, the reset to local time will occur within approximately seven minutes of arrival to an area having a transmitter 44 that is connected in the system 22. The day and date displayed by watch 20 are also automatically adjusted.

Each watch pager in system 22 has a unique serial number correlated in the memory of Clearinghouse Computer B to an assigned telephone number of the user of the pager. Thus, a paging message can be sent to the receiving user by anyone who knows that telephone number or the name and customary local area of residence of the receiving user. Paging messages can be sent to a receiving user anywhere in the world that has a transmitter 44 connected to system 22. To facilitate this capability, the receiving user notifies the system 22 of his current location via a Touch-tone telephone.

1.2 Sending a Page

A sending user initiates a page by dialing the local paging telephone number on telephone 24 and awaiting computer voice instructions. The first instruction requests the telephone number of the receiving user desired to be contacted. Multiple receiving users at the same telephone number are assigned one or two unique digits in addition to the telephone number to differentiate them. After system 22 confirms the number or name of the person to be paged, the sending user presses the asterisk (*) key and a next instruction will be given.

The above-mentioned next instruction is a menu of the preferred messages that the sending user can send, as follows:
press:
1 call work
2 call home
3 come home
4 call number entered
5 special message up to fifty characters long
6 leave a voice message
7 retransmit messages
8 to hear voice messages
9 to repeat entry of telephone number of person to page
This instruction menu is ordered in accordance with descending likelihood of usage of the various messages.

The sending user selects the appropriate message by pressing the associated number on the keypad of telephone 24. If 1, 2 or 3 is pressed, no additional data need be entered. Upon the user hanging up, the message will be sent with a normal priority.

If the sending user presses 4, it is necessary to enter the number that should be called, which can be up to fifteen digits long.

If the sending user selects 5, the message sent can include both numbers and alphabetic characters. To send a letter of the alphabet, the key upon which the letters appears is pressed a number of times determined by the order of its position on the key. For example, pressing key 2 once is an "a"; pressing key 2 twice is a "b." The clearinghouse computers determine how many numbers to group together to get a letter based on the time between keystrokes, so the sending user should pause briefly between entering each alphabet character. One asterisk (*) is used to indicate a space between words; two asterisks (**) are used to indicate a period or end of sentence. A number sign (#) indicates that the next keystroke will send a number, not a letter. The system can provide for a limitation on length of message, for example, fifty characters. If the sending user attempts to send more than fifty characters, the clearinghouse computer will stop accepting data and transmit a computer-voice-generated message to the sending user, and continue to the next part of the menu.

For example, to send the message, "John Doe will arrive at 9 o'clock." the sending user presses 56664466*366633*9444555555*2777744488833*28*#9-*66622255566 622255**. This message is thirty-two characters long. The words "John Doe will arrive at 9 o'clock" will be displayed on the receiving user's watch. If the message is longer than twelve characters, it will be displayed at a rate of one long word or two short words per second. If the message is labeled as "urgent," an exclamation symbol (!) will be displayed at the beginning and at the end of the message.

Continuing down the menu, by pressing 6, the sending user may leave a voice message that will indicate that the receiving user should call voice mail. A computer-generated voice will direct the sending user on how to leave a voice message for the receiving user.

The instruction associated with key 7 is used by the receiving user. By calling in to the system and pressing key 7, the receiving user causes the system to transmit or retransmit all of his messages from the previous twenty-four hours. Upon calling in and pressing 7, the receiving user would be prompted by computer voice to enter the telephone number from which he is calling, including the country code, city or area code and the local number. If he does not enter a number and hangs up, messages will be retransmitted within his home area, region or nation, depending on broadcast coverage. Entry of a phone number allows the paging system to know where to send the receiving user's messages. The computer voice will confirm what country and city the user has entered, and will request reentry of the number if either are invalid numbers. If there is no broadcast coverage in the area entered, the receiving user will be so informed and the messages will not be sent.

Instruction 8 is also provided for the receiver user. By calling in to the system and selecting 8, the user can receive voice messages that have been left for him. Again, he will be instructed by the computer-generated voice on how to retrieve the messages. A receiving user can be assigned a secret code number which must be entered into the system to receive voice messages.

If the caller into the system presses 9, the foregoing instruction sequence is repeated.

A final instruction is provided which is valid only for operation in connection with the foregoing instructions 1, 2, 3, 4, 5 and 6. This instruction establishes the priority or urgency of the message:
press:
1 for urgent
2 for normal
3 for low priority.

An urgent message will be sent up to four times in the span of thirty minutes. A normal message will be sent three times in thirty minutes. A low priority message will be sent as soon as higher priority messages have been transmitted, approximately twice in sixty minutes.

The sending user may hang up the telephone after pressing the urgency code if the receiving user to be paged is in such receiver user's home area.

1.3 Watch Pager Arrangement

Referring back to FIG. 1A, paging watch 20, used by each receiving user, is arranged much like a conventional digital wristwatch. The watch has a wristband 70, which incorporates an antenna, as described hereinafter, and an electronic clock and paging device 72. Device 72 includes internal electronic circuitry, shown in block diagram form in FIG. 11A. Device 72 has an analog watch display face 74 and, optionally, a day-date display 76, both of which are conventional. Device 72 also includes a paging data display 78, for displaying an area code and telephone number and various message symbols.

Device 72 has four control buttons 80, 82, 84, 86, two on each side of the watch face. Button 80 is a conventional analog watch time and date setting control knob. Button 82 is a function select button for displaying and acknowledging messages, toggling the bell/silent message-waiting signal, and for toggling the roam/home function. Button 84 determines the mode of operation of the watch. Button 86 is a reset button, pressed once to resynchronize and test the device after changing the battery and twice for serial number and registration of the watch.

An alternate embodiment of display 78a, shown in FIG. 1B, contains two rows of characters. The top row of characters are icons including, reading from left to right, a call home symbol 88, a call office symbol 90, a bell/silent symbol 92, a roam/home symbol 94, a signal availability symbol 96, a low battery indicator 98, and an unacknowledged message counter 100. When the bell/silent symbol 92 appears, an audible signal will be generated by a beeper in the device 72 when a message is received. The signal availability symbol 96 flashes when device 72 is scanning for a signal, is off when no signal can be found, and is on steadily when a valid signal is found. The unacknowledged message counter 100 displays the number, 1 through 9, of messages not acknowledged. If 0 is displayed, no messages have been received and the device displays the current time in row 102. If a 9 appears, flashing, no more messages can be received until the receiving user presses the select button to display and acknowledge the messages stored.

The second row 102 of characters is a ten-digit, two-colon display of seven-segment characters. A more complex display, such as a fourteen-segment or a dot-matrix character display, can be used as an alternative, to display alphabetic as well as numeric characters.

1.4 Receiving a Page

Upon receiving a page, the receiving user will be notified by a signal from watch pager 20 either audibly by beeps from the internal beeper or visually by rapid, e.g., flashing of bell 92 on display 78 and incrementing of the unacknowledged message counter 100. The selection between the audible and silent signal is made by actuation of select button 82 while in the mode in which the bell is flashing. If the audible signal has been selected, bell icon 92 will be displayed continuously. If silent signal has been selected, the bell icon will not be displayed.

The simplest messages are displayed by the icons. For a call home message, the house icon 88 is displayed. For message to call the office, factory or desk icon 90 is displayed. For a message to call a telephone number, transmitted by the sending user, the number is displayed in the row 102 of characters. Long telephone numbers are split up with the country and city or area code displayed first and the additional numbers displayed after the user presses the select button 82.

For all types of pages/messages, the first items displayed after receiving a message are the time of message reception in hour and minutes and message number. In the case of call home and call office messages, upon reception, the lower display will only show the time of reception and message number. If the message is to call a transmitted telephone number, the time and message number will be displayed for approximately three seconds before the telephone number to be called is displayed.

The select button 82 controls the displayed message. Pressing the select button will let the watch know that the receiving user has read the message, whereupon the watch will display the next oldest message. Before receiving the first message, the unacknowledged message counter will be 0. This will cause display of the normal watch function of time, day and date on display 78. Once the first message is received, the message counter will be set to a 1 and the message will be displayed. If another message is received before the user presses the select button, the message counter will be set to 2. The first unacknowledged message will continue to be displayed and the second and subsequent unacknowledged messages up to nine total will be stored in a first-in first-out (FIFO) memory in device 72. If messages continue to be received and not acknowledged by the user pressing the select button, the message locations will eventually become full and no new messages can be received and stored. When this happens, the unacknowledged message indicator 100 beings flashing. If the receiving user presses the select button, then the unacknowledged message counter will point to the next oldest unacknowledged message and the acknowledged older messages will be deleted when the message locations are full, allowing reception of new messages. The oldest unacknowledged message is always displayed, and an unacknowledged message count of 1 always displays the latest message received. Pressing the select button when the counter is 1 will again display the normal watch function of time, day and date and the counter will be 0. If mode button 84 has been set in the scroll mode, pressing the select button again will wraparound the oldest message contained in the message memory and cause it to be displayed on display 78.

If the receiving user has been constantly in range of a transmitting tower 44, and the watch pager has been locked onto a transmitter frequency and received valid transmissions, then the tower icon 96 is constantly on. If the receiving user has been out of range of the transmitter or there has been some malfunction that prevents valid signal reception during the assigned time slot of such user's device, this condition is indicated by the absence of the transmitter tower icon 96 on display 78. Because the preferred embodiment utilizes FM signal transmission, difficulty in receiving signals can arise if the receiving user is in a valley or large building. To alleviate this problem, all messages are transmitted at least twice, at various time intervals.

If the receiving user has been traveling in a poor reception region for a long time or traveling in an airplane, then such user can request that his messages from the last twenty-four hours be retransmitted. This is done by calling the paging telephone number and selecting menu option 7. After hanging up, the receiving user presses the reset button 86. This will cause the paging watch device 72 to "wake up" or reset and immediately search its stored frequency list for a valid signal. The tower icon 96 will flash and, if an alphanumeric display is used, the word "RESET" will be displayed on the digital display 78, indicating that the receiver is searching for valid signals.

Once a valid signal has been found, the watch pager searches for messages to be transmitted. When the message with the time, day and date are received, the display 78 reflects this by turning icon 96 on steadily and displaying the time, day and date in line 102. The message with time, day and date also contains a list of the home frequencies, and other information about the local system. As further discussed hereinafter, home frequencies are the FM transmission frequencies within the present locality of the receiving user. Usually, these are the frequencies in the local area where the receiving user resides but, if the user travels to a new area, a new set of home frequencies is stored for the new area. Pressing reset will cause a slightly increased drain on the batteries for about one minute. The watch pager will then return to a normal mode of operation, described hereinafter, of looking for transmissions at the pager's assigned time slot. Any messages the pager has already received and not deleted will not be displayed, as each message has a unique identification number.

If a receiving user expects to be traveling outside of his home standard metropolitan area, such user should put the receiver into home/roam mode by pressing button 84 until the icon 94 of a roaming man begins flashing. The receiving user then presses select button 82. If the icon disappears, the receiver is in the home mode and it searches its list of home frequencies for valid signals. This searching is done in a time period just before the receiver's assigned time slot. If a valid signal is found, then the transmitter tower symbol 96 will be constantly on until the next search time. If no valid signal from the list is found, the transmitter tower symbol is turned off. Home mode is a battery-saving feature.

To move to the roam mode, select button 82 is pressed until the icon 94 is steadily on. The receiver again searches for a valid signal in the home frequency list first, but if no signal is found, it will then search all possible frequencies. After receiving a valid signal, a new home frequency list will be received from the local clearinghouse. Full searching will resume only if a valid frequency in the new home frequency list is not found in the next assigned time slot. If no valid signal is found after several all-frequency searches, then searching stops until the next assigned time slot and the tower icon 96 is turned off.

Watch pager 20 uses conventional watch batteries, which should last about one year under normal use. A weak battery is indicated by battery icon 98 flashing on and off at about one second intervals. Depending on the amount of subsequent usage, this indicator provides about twenty-four hours warning in which to replace the batteries. After replacing the batteries, the receiving user presses the reset button 86 to start the watch looking for current time, day and date and for messages, for all possible frequencies.

If transmission of a message has been missed and the transmission of another message is received later, the missed message is displayed as hyphen marks "--," then the message number modulo 32. The hyphen marks and the message number indicate that it is known by the message number that a message was missed but was not properly received. This message will remain in memory until the missed message is received in a retransmission. If a missed message is not received and new messages accumulate to fill the memory, the missed message is pushed off the stored message stack by the newer messages. To display the valid message received, the select button 82 is pressed. If the message previously missed is later received in a retransmission, then the proper message will be immediately displayed, since it will be the oldest unacknowledged message.

For example, assume a message to call a telephone number is received at 10:30, and it happens to be message 32 (message number is modulo 32). Then the sequence of information displayed on the lower display 102 would be as shown below, starting with the first line and displaying the next on the conditions explained:

| Display | Explanation |
|---------|-------------|
| 10:30-31 | time received and message number 1 through 32 displayed for 3 seconds |
| 123-456- | country and (city or area code) displayed (if sent) until next select |
| 789-0123 | exchange and local number displayed until next select |
| 10:35 | time of day, displayed until next select or new message received |
| 85-07-23 | Date displayed if select 82 was pressed, displayed until next select is pressed |
| 10:45-32 | time received and message number displayed if new message arrives |

Operation of the watch pager 20 is tested in a test mode to verify that the watch pager and system 22 are functioning properly. Pressing select 82 while in the test mode (the tower icon will be flashing off and on) causes the watch pager to look for a valid signal immediately instead of at its assigned time slot. If the watch pager is working properly, in a good reception area, and there is a broadcast tower transmitting a valid data protocol, then the tower icon 96 will be constantly on. If there is no valid signal found in the frequency search list, then the tower icon is turned off. The test mode, like all other modes, is exited by pressing the mode button.

2.0 System Description

2.1 Network Hierarchy

Referring to FIG. 2A, a portion of global paging network 22 is shown to illustrate the levels of hierarchy within the network. At the lowest level, K, are receiving units 20, 20a, 20b, 20c and 20d. The receiving units can be portable watch pager receivers like device of FIG. 1A, or can be functionally equivalent fixed base units such as receiver 20a of FIG. 2A, which services a data transmitting and receiving subscriber 24a. All of these receivers receive transmissions of data by FM broadcast from transmitters 44, 44a, 44b, 44c and repeater 44d. Associated with each transmitter is a verification receiver 45, which includes receiver apparatus functionally equivalent to that of device 20. It receives and decodes transmissions from each transmission tower 44 and compares the decoded data with the corresponding data input to the transmitter to verify the accuracy of transmission. This verification is ordinarily carried out at a local clearinghouse such as Clearinghouse B. At the next level in the hierarchy, level I, are the local data communications and telecommunication networks, including telephone interface 32 for telephones 24 and voice mail subscribers 24b. At level H are the local clearinghouses, identified with reference numerals 34, 36 to correspond to FIG. 2B.

Farther up the hierarchy, the network 22 includes regional data communications network 38 and a regional telecommunications network 39, through which additional subscribers 24C can access the system to send paging messages or can subscribe to the system. The regional data and telecommunications networks 38, 39 are connected, in turn, to a regional clearinghouse 110. The regional clearinghouses 110, 110a, 110b operate much as a local clearinghouse but on a regional basis. It transfers paging and other digital messages from one locality to another through the regional data communications network 38 to the appropriate local clearinghouse for broadcast in the locality of the intended recipient of the data.

Above the regional clearinghouse level, at level E, are national data and telecommunications networks 112, 114. A national system subscription and service center 116 is connected to the national data communications network 112. Page-sending users and other subscribers 24D can also assess system 22 at the national level through the national telecommunications network 114. Transfers of information at the national level are handled by national clearinghouses 118, 118a, 118b, as illustrated at level D. The national clearinghouses are in turn connected to a continental data communications network 120, illustrated at level C. Transfers of blocks of digital data between nations are controlled by continental clearinghouses 122, 122a, 122b. Transcontinental or global transfers of data are made over a global data communications network 124 under control of a single global clearinghouse 126.

It should be understood that the foregoing is a simplified illustration of a global paging network 22, many interconnections and collateral blocks being omitted for clarity. It will also be appreciated that single block elements, such as regional data communications network 38 can comprise elements of a number of other networks, such as telecommunications company and private digital data packet networks. Likewise, the regional telecommunications network 39 can include various elements of different telecommunications organizations, connected both in parallel and serially.

2.2 Clearinghouse Arrangement

Figure 4:
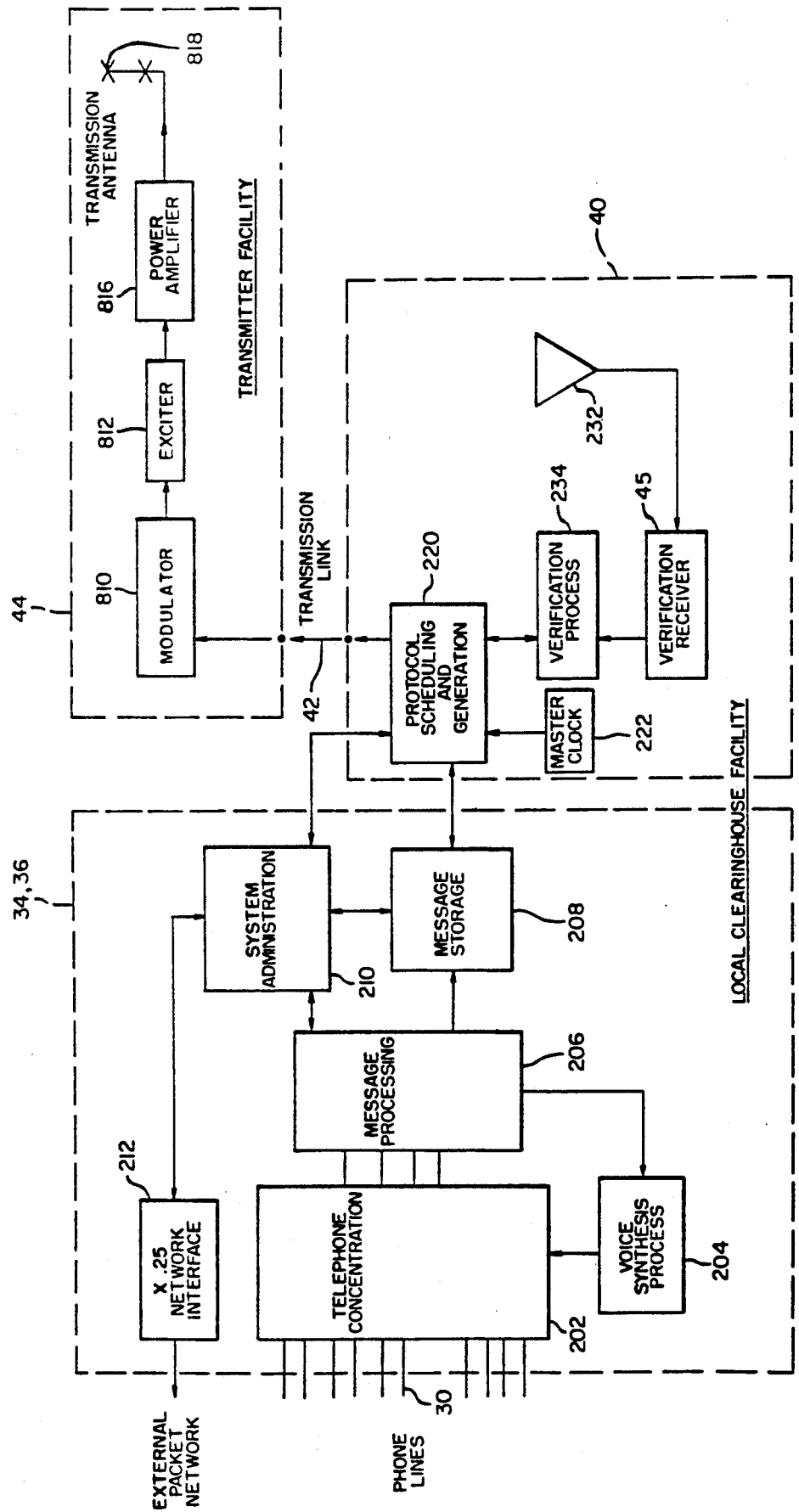
FIG. 4 is a block diagram of a portion of the system of FIG. 2A showing a local clearinghouse facility and a transmitter facility.

FIG. 4 shows, in greater detail, a local clearinghouse facility and transmitter facility. Relating FIG. 4 to FIG. 2B, each local clearinghouse facility includes the capabilities of both Clearinghouse A and Clearinghouse B. Each local clearinghouse includes a computer facility, indicated by a dashed line block bearing reference numerals 34, 36 to correspond to Clearinghouse Computers A and B in FIG. 2B. Sending-user messages enter the computer facility via phone lines 30, being received by telephone concentration unit 202. Sending user interaction is facilitated by voice synthesized instructions provided by a voice response processing unit 204. Units 202, 204 collectively provide the communications interface 32 of FIG. 2B. A computer, including message processing unit 206, message storage 208 and system administration elements 210 provide the remaining functions of computer 34 on the left side of FIG. 2B. A packet network interface 212 connects the local clearinghouse computer to receive and transmit packets of data from and into an external packet network 38. An operator assistance block can also be provided in conjunction with multiplexer 202 to provide assistance to a page originator who cannot properly respond to the automated instruction sequence.

Moving to the right side of FIG. 2A, elements 206, 208, 210 in FIG. 4 also provide the functions of Clearinghouse Computer B. They receive and process messages and transfer same to a queuing machine 40, which includes a second computer 220 for protocol scheduling and generation. Queuing machine 40 need not be co-located with the primary clearinghouse computer 34, 36. Computer 220 has a master clock 222, which controls the timing of all messages that are broadcast in the locality of the local clearinghouse facility. Messages are formatted by computer 220 and queuing machine 40, in accordance with a protocol described hereinafter.

The paging messages are then sent by transmission link 42 to transmitter facility 44 in the order in which they are to be transmitted. The transmitter facility generally includes a subcarrier generator and modulator 810, an exciter 812, power amplifier 816, and an antenna 818. As mentioned above, messages are broadcast from antenna 818 for reception by watch pagers 20 and various other receivers shown in FIG. 2A.

One such other receiver is the verification receiver 45, mentioned in connection with FIG. 2A. The verification receiver includes an antenna 232 for receiving transmissions broadcast from antenna 818. Received transmissions are output to a verification process unit 234. Unit 234 performs a comparison between the data transmitted from computer 220 and the decoded data from the verification receiver. If an error is detected in the decoded data, computer 220 is notified. Computer 220 causes the data to be retransmitted at the appropriate time to the addressed receiver. The verification receiver and decoding elements are functionally the same as those used in watch pager 20, as described hereinafter with reference to FIGS. 10, 11A, 11B and 14.

2.3 Clearinghouse Data Flow

Figure 3A:
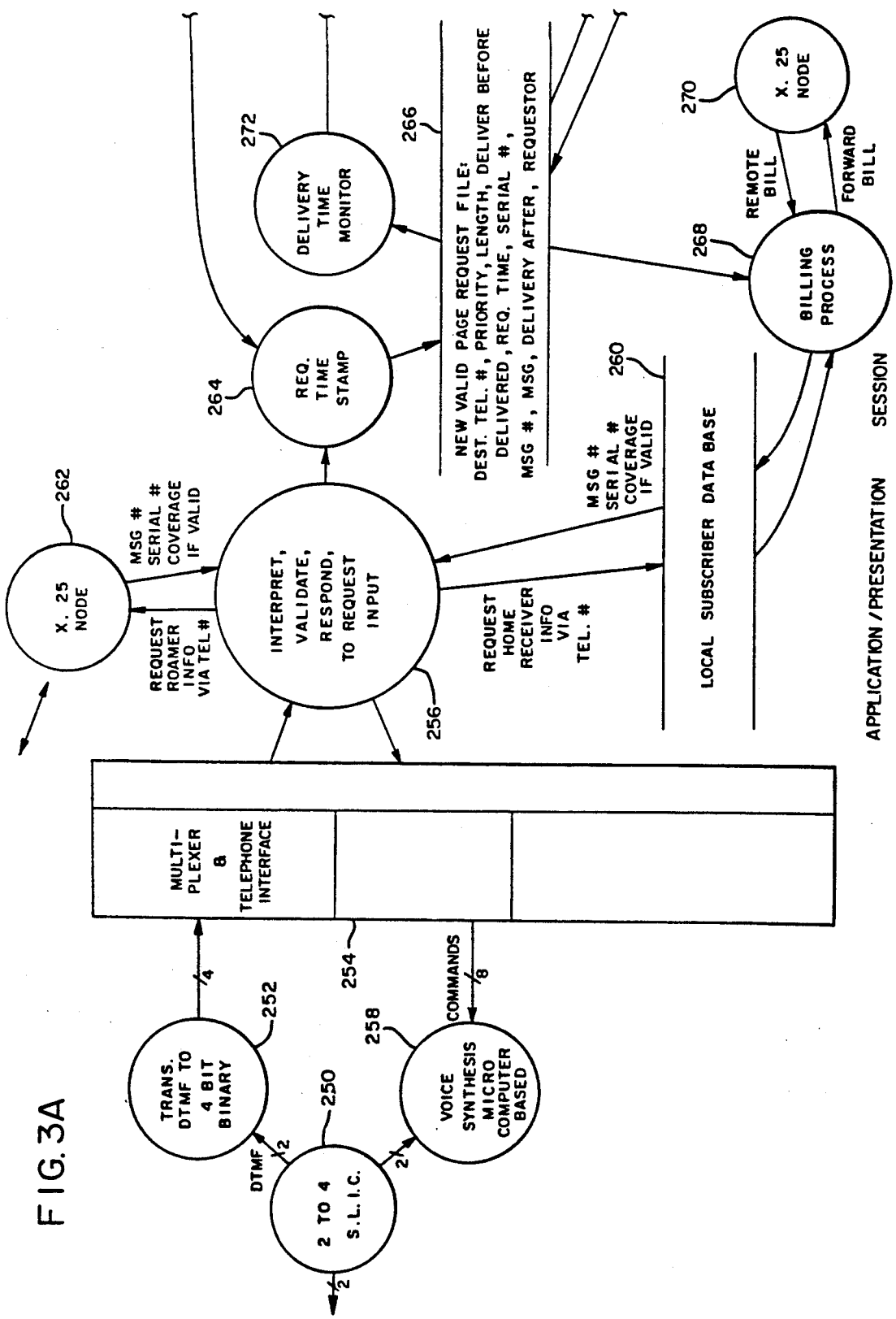

Referring to FIGS. 3A and 3B, the data flow through a clearinghouse proceeds generally from left to right in the drawings. Relating FIGS. 3A and 3B to FIG. 4, the left portion of FIG. 3A covers the function of the telephone interface 202, 204. The right portion of FIG. 3A and left portion of FIG. 3B encompass operation of the clearinghouse computer, including elements 206, 208 and 210. Receipt and transmission of data via packet interface 212 is also covered in the last mentioned portions of FIGS. 3A and 3B. The right portion of FIG. 3B encompasses operation of queuing machine 40. The various blocks and circles in FIGS. 3A and 3B represent process steps in the data flow and are given distinct reference numbers. They relate, however, to various elements in the block diagram of FIG. 4 and so, where appropriate, the appropriate block in FIG. 4 is also identified parenthetically.

Starting on the left of FIG. 3A with the telephone interface, data previously generated via buttons on a Touch-tone telephone 24 (FIG. 2A) enters step 250. A DTMF tone is thereby generated for each button pressed. These tones are translated into binary code in step 252. This binary data is transmitted to a multiplexing step 254 (block 202 in FIG. 4) to the local clearinghouse computer (block 206). In step 256, the input data is interpreted, validated and a response is generated. The response is relayed back through the multiplexer and translated into a synthesized voice response in step 258 (block 204), which is transmitted to the user via telephone 24.

The large circle representing step 256, labeled "interpret, validate, respond," represents the beginning of the operation of the clearinghouse computer. Data coming in over the telephone lines is interpreted. A check is made in step 260 against the local subscriber data base (block 210) to determine whether the telephone number input by the transmitting user for the intended receiver of the page is a valid number. If valid, the local subscriber data base indicates to the computer the message number of the current request, the serial number of the watch pager to receive the message, and the coverage area for the receiving user.

If the requested telephone number is outside the local subscriber data base, a request for roamer information is made at step 262, over the international network to the proper clearinghouse. Each clearinghouse has a list of telephone exchanges within each telephone area code. If a paging message request is not for the local clearinghouse, the proper clearinghouse is determined and is sent to a subscriber information request. The purpose of this request is to determine if the message request is to a valid receiver. If it is, a message number, a watch pager serial number and subscriber coverage area will be sent back over the network to the originating local clearinghouse for processing again in accordance with step 256.

Once the foregoing information has been supplied from either the local subscriber data base or from a remote clearinghouse, the request data is passed to the request time stamp process 264. This process adds to the request data the time and date the request was made and places the message into a new valid page request file 266 (block 208). This file contains all of the information necessary for the delivery of messages and sends information eventually to a billing process 268 (block 210).

Validated requests for pages originating from remote clearinghouses enter the data flow at packet network node 278 (block 212). They are passed to time stamp process 264 for further processing in the same manner as locally originating paging requests, as hereinafter described. Incoming and outgoing billing information is likewise transmitted to and from other clearinghouses via packet network node 270 (block 212).

Following steps 264 and 266, a delivery time monitor procedure 272 is performed on the validated page requests. The delivery time information is supplied by the sending user. When no delivery time is supplied, this procedure defaults to no delay. Procedure 272 monitors the page request file 266 (block 208 in FIG. 4) to check for messages that are ready for delivery. When messages are ready for delivery, they are sent to a destination clearinghouse sorter 274. This sorter determines whether the destination number is within the coverage of the local clearinghouse, as determined by the broadcast area of associated transmitter facilities 44. If not, the message is forwarded via the packet network node 278 to another clearinghouse. If the message is to be broadcast locally, it is then sent to a determine coverage process 280. The clearinghouse sorter uses a data base 276 to determine to which other clearinghouse a nonlocal message should be sent.

FIG. 3B illustrates a single system having three transmitter facilities or stations 1, 2 and 3. If a receiving user has subscribed for coverage over an entire local service area, e.g., covered by all three transmitter facilities, the messages will be sent to all three transmitter facilities. If he has subscribed for coverage only in a portion of the service area, such as a suburb of a major metropolitan area, the message may only be sent to one transmitter represented by station 1 queuer node 282.

Figure 2C:
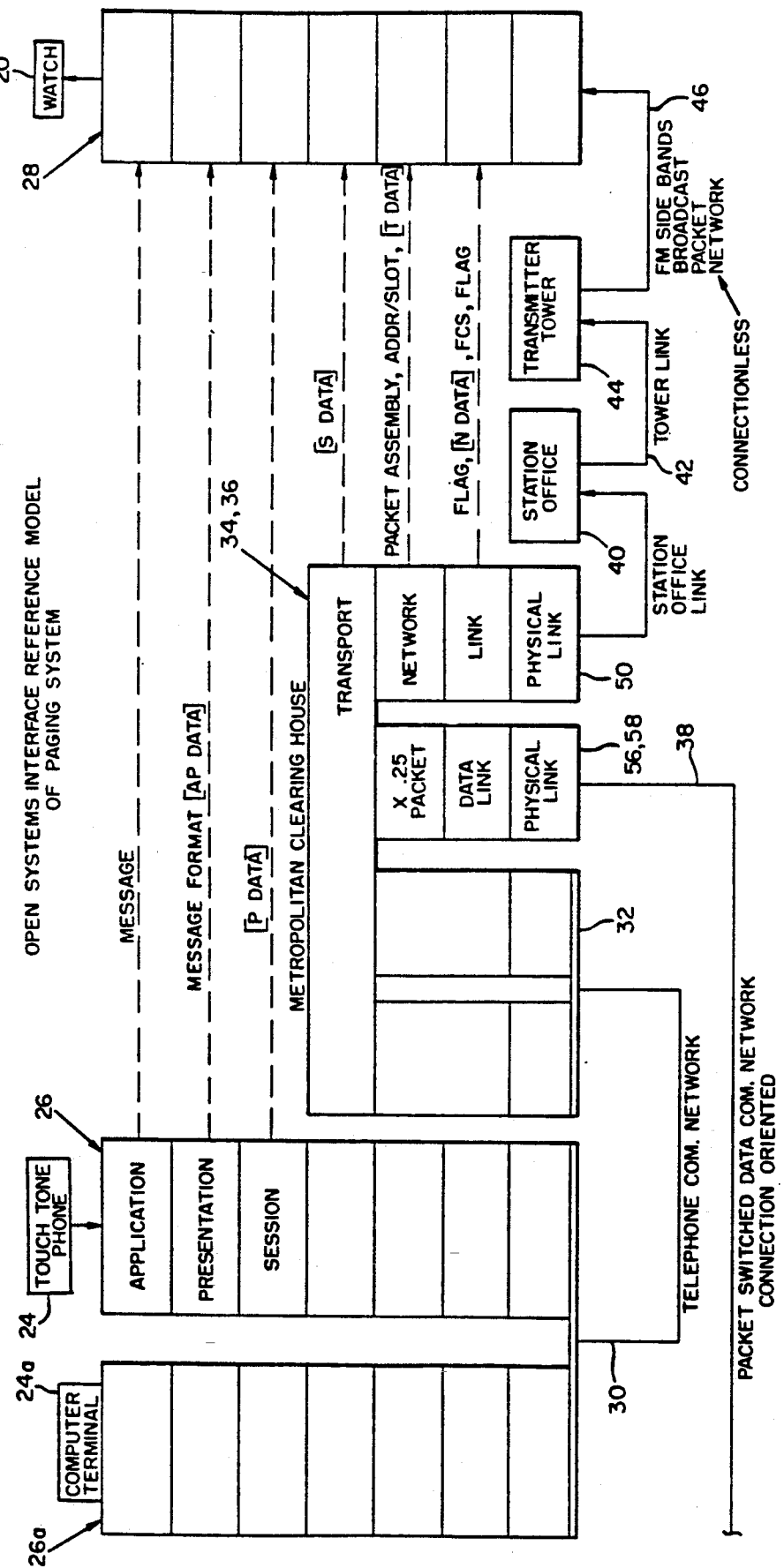
FIG. 2C is a more detailed OSI model of the system of FIG. 2A, showing further details of the preferred form of communications network and data protocol.

The data flow to the right from each station queuer node 282, 282B, or 282C represents the network, link and physical layers in the OSI model (FIGS. 2B and 2C). Each station queuer node places a message to be transmitted in the time slot corresponding to the address of the intended watch receiver 20. Transmission of messages is prioritized, placing the highest priority message first in the queue. Priority messages may also be repeated more frequently than routine messages to obtain a predetermined quality of service higher than that accorded to routine and low priority messages.

Data from a queuer node such as node 282 (block 220) is then sent over a physical line or transmission link 42 to a transmission tower where the information is broadcast over the airways. A station verification receiver 288 (block 45) receives and decodes the broadcast messages and forwards them to a verification process 290 (block 234), which compares the streams of data as transmitted by the queuer and broadcast by the transmitter facility. If the streams of data do not match, the verification processer notifies the queuing process 282 (block 220) for a possible requeue of the message by the station queuer, as indicated by the link frame process 290 back to queuing process 282.

Once each station queuer node has satisfactorily completed transmission of a message, it sends a confirmation to a message delivery confirmer 302. From the coverage information provided in step 280 the conformer determines whether the information has been sent out over all the towers. It then puts information into page request file 266 to indicate delivery confirmed.

The billing process 268 then takes information about confirmed delivered messages and from the local subscriber data base 260, obtains information about where the receiving user lives and their address and sets up an information block for generation and sends a bill. If a message was for someone outside the local subscriber data base, a bill is forwarded over the X.25 Node 270 to that subscriber's local clearinghouse.

This system provides the capability of transmitting accurate time to the watch pagers. An accurate clock signal is provided (block 222) by a WWV receiver which picks up the time from WWV Boulder, Colo., and transmits the time information to the station queuers in procedure 300.

3.0 Data Protocol and Receiver Operation

3.1 Protocol Generation

Messages within the system are transmitted in discrete packets of digital information, both between clearinghouse A, B in different areas over conventional packet switched networks and from a clearinghouse via a transmitter facility 44 to watch pager 20 within a local area. A data protocol governs the format and relative timing of the packet transmission to permit a receiver portion of a watch to be active only during the time that packets intended for it are being transmitted, as hereafter explained in detail. Power consumption by the watch pager is reduced significantly because receiver 840 and decoding section 700 (FIG. 11A) within it are then active a minimum of about 0.006% of the time in continuous operation, receiving a single-packet message every 7.5 minutes from a single transmitter. If the user travels frequently necessitating scanning for transmission channels, or frequently receives more or longer than single packet messages in each frame, the ratio of on-time to off-time is typically about 0.02%. For a pager used in emergency applications, such as a fireman's pager, a message can be transmitted in every subframe, for an on-time/off-time ratio of about 0.2%. With conventional watch batteries, this ratio of 0.2% provides about one week of service between replacement or recharge of batteries. A maximum ratio of about 1% is necessary to limit replacement or recharge of batteries to once per day. That is considerably less than receivers keyed to conventional protocols such as POCSAG and GSC, which require the receiver and decoding sections of pagers to be active about one-third of the time.

Referring to Table 1 below and to FIG. 2C, a portion of the overall protocol is associated with each of the seven layers in the OSI model. FIG. 2C shows with dashed lateral connection lines the protocol of communication between a sending user and a receiving user at each layer of the model. The dashed lines do not represent an actual lateral connection at the upper five levels; such connection is made only at the physical link level, as indicated by solid lines. Vertically adjacent layers are connected by interfaces that provided an actual physical path for the message from the sending user to the receiving user. In a physical sense, the protocol at each layer is added to the message as the message, as sent by the sending user, moves downward along the physical path from the application layer to the physical layer. Conversely, the protocol is decoded and removed a layer at a time from the message received at the physical link level as it travels upward from the physical layer to the application layer. FIG. 2C summarizes the protocol changes at each level and Table 1 details and explains the entire message content and format of the protocol at each layer. FIGS. 3A and 3B are also labeled along the lower margin to indicate the relationship between the process steps and the layers of protocol detailed in Table 1.

TABLE 1

OSI REFERENCE MODEL OF TRANSMISSION SYSTEM

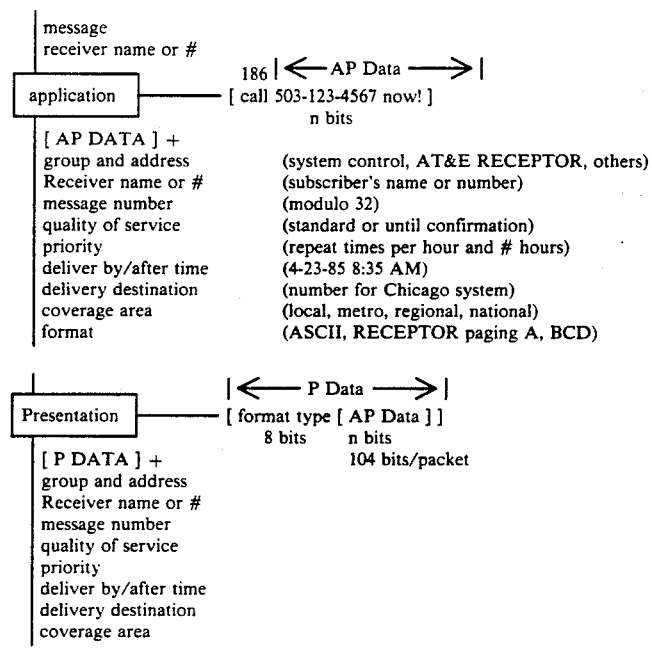

TABLE 1-continued
OSI REFERENCE MODEL OF TRANSMISSION SYSTEM

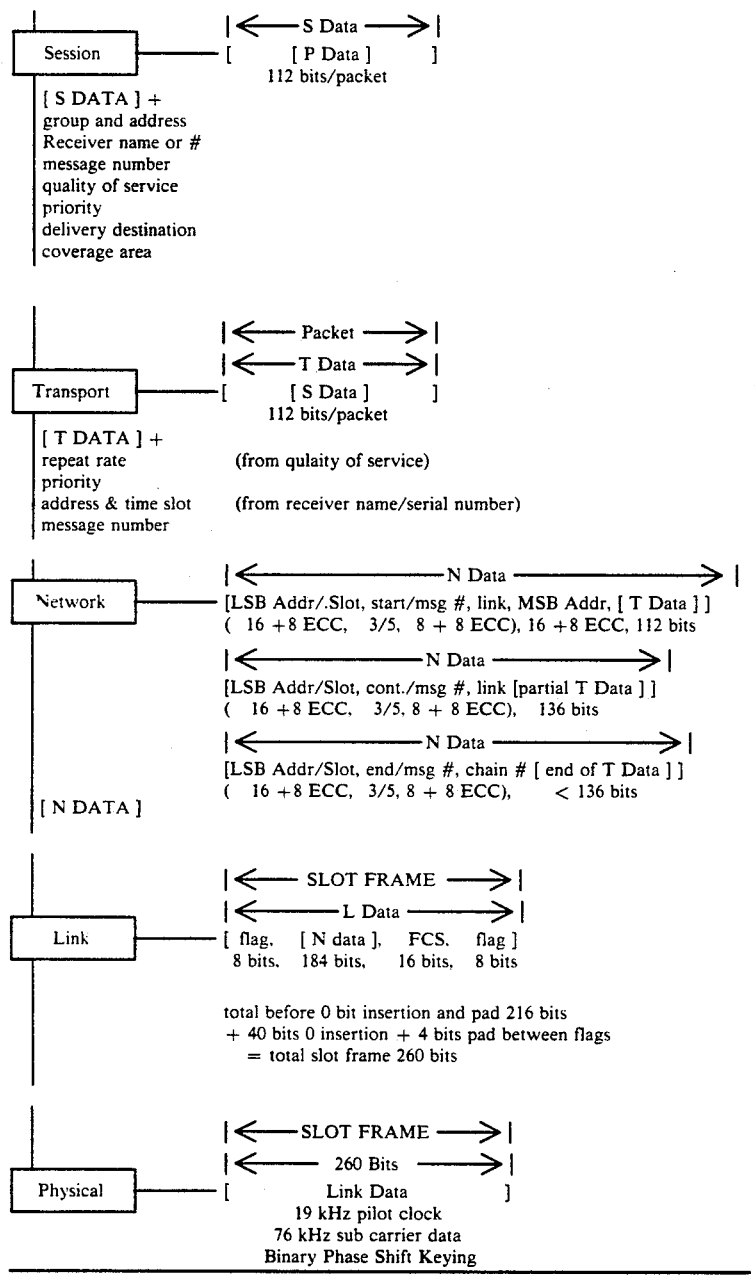

As Table 1 and FIG. 2C show, the sending user at the application layer enters a message (AP data) which may comprise n bits. The AP data is the protocol at the application layer, interpreted by the receiving user at a watch 20 of column 28 in the form it is entered at the telephone 24 of column 26 or at a computer terminal 26A. The AP data may be encoded in an extended binary coded decimal (BCD), with 0-9 numbers as usual, A indicating a space, B indicating a hyphen, C indicating a colon, D indicating an urgent message, E indicating a need to call home, and F indicating a need to call the office. The sending user also enters other information to direct the page, such as the receiver name and number, the priority of delivery, etc. This data is passed with the AP data and other data provided by clearinghouse A (group and address of the receiver, system control information, message number, etc.,) to the presentation layer. At that layer, a message format number which defines the message format is added in BCD to the AP data to form the protocol at that layer, the P data. The message format indicates the type of data coding, such as binary, ASCII, etc. The message format for watch receivers is the binary equivalent of decimal 06, as shown in FIG. 5C. The protocols at these two layers are generated by process steps 250 through 258 in FIG. 3A.

The session layer of the model schedules the transmission of the packets and the transport layer determines which network the packets will take to reach the intended receiving user. In this embodiment of the system, neither the session nor the transport layer adds data to the protocol of the presentation layer. The locations of these layers in the data flow are shown in FIG. 3A and FIG. 3B. As shown in FIG. 2C, the transport layer protocol is between metropolitan clearinghouse 34, 36 and the watch 20 (column 28). The interface between the session and transport layer is the telephone communication network 30.

At the network layer, the protocol includes bits forming an address field for addressing a watch receiver. This field corresponds to the timing format for transmission of packets. The protocol also includes bits forming a packet assembly field for disassembling and reassembling messages too large to fit within one packet. As shown in FIG. 3B, these bit fields are added at the station queuer nodes 282, 282B, 282C by the protocol generation and scheduling block 220 of queuing machine 40 in FIG. 4. Block 220 of queuing machine 40 is provided by a microcomputer running high-level and assembly-language software programs which add the protocol bits to the data packet and schedule the packet for transmission with reference to master clock 222. The data packet is then either transmitted through a transmission link 42 to the transmitting facility 44 of FIG. 4 for local broadcast or transmitted through the X.25 network interface 212 into a conventional packet switched network 38 for delivery to clearinghouse B in another region. In FIG. 2C, this transmission through the X.25 network interface is shown by line 38. The messages carried by the data packets are transmitted at least twice to each receiver in low priority to improve the chances that the message will be detected. In normal priority, the messages are transmitted more often. It has been found that on the average a receiver will detect nine out of ten messages that are transmitted once. By transmitting each message at least twice, the chances improve to about ninety-nine out of one hundred. Higher priority messages are transmitted even more frequently than normal priority messages.

3.2 Message Format

Figure 5A:
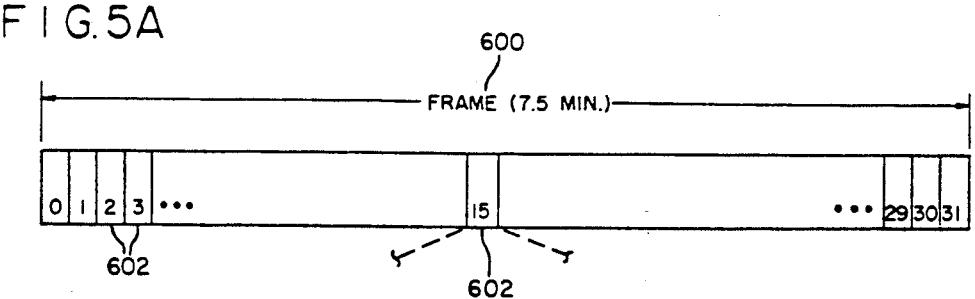
FIGS. 5A, 5B and 5C show the preferred form of digital data protocol employed in a paging or other data delivery system according to the invention.
Figure 5B:
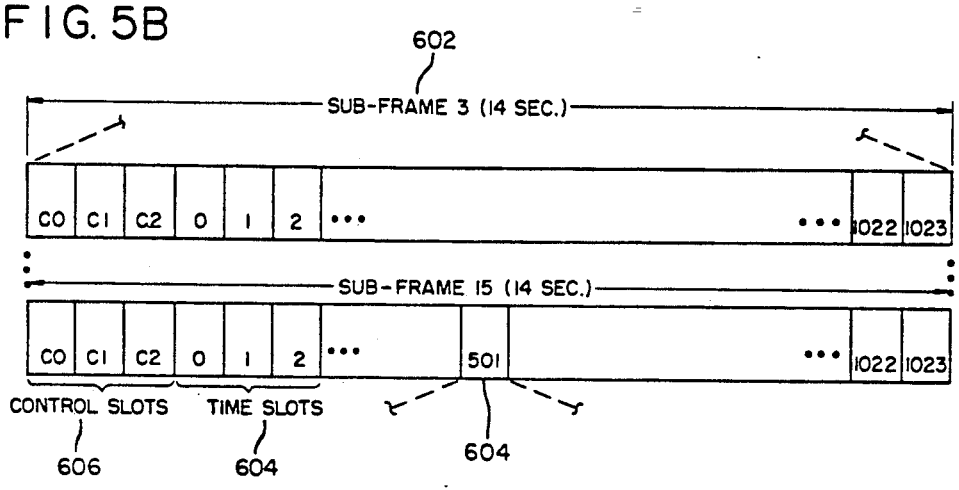
Figure 5C:
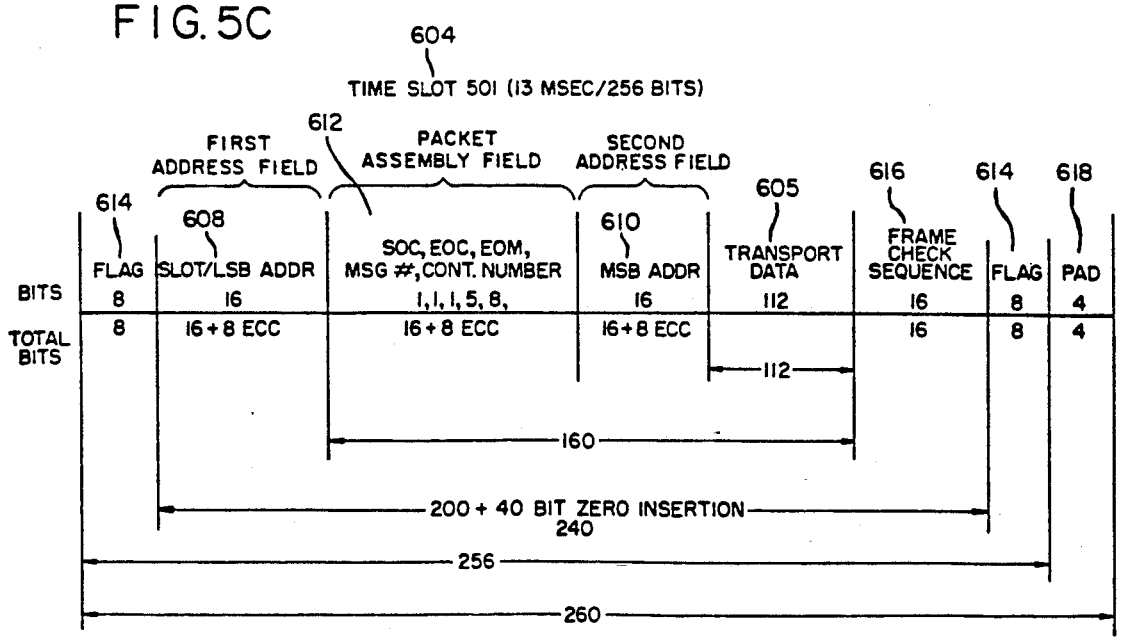

The format for transmitting messages is shown in FIGS. 5A through 5C. The format comprises a time frame 600 (FIG. 5A) of a predetermined length such as seven and one-half minutes, which is repeated cyclically. Within each frame 600 are a predetermined number of subframes 602. Thirty-two subframes of about fourteen seconds each are shown in FIG. 5A. Each subframe is uniquely numbered 0, 1, 2 . . . 31. Moving to FIG. 5B, each subframe in turn comprises a predetermined number of time slots 604 during which a packet is transmitted. In FIG. 5B, 1,024 time slots of about thirteen milliseconds each are shown. Each time slot is uniquely numbered 0, 1, 2, . . . 1023. In the illustrated example, the numbering of the time slots and subframes is sequentially increasing but this particular numbering scheme can be different so long as it repeats predictably in each frame. Subframe and time slot number information are sent in the transmitted data, and used by the receivers, as described hereinafter to determine a reference point within a frame.

Each packet transmitted within a time slot contains 256 bits of information and 4 padding bits and carries 112 bits of message or transport data 605, as shown in FIG. 5C. Each subframe also has control slots 606 for transmitting packets of control information. Control slots 606 are like time slots 604 in both duration and format, but differ in information content as described hereinafter.

The size and duration of frames, subframes and time slots can be varied. The duration and number of time slots should, however, be of the order illustrated to enable a very short receiver duty cycle (e.g., as low as 0.006% in the illustrated example) and frequently-recurring opportunities to transmit paging messages to a large number of users on a single channel (32,768 time slots per 7.5 minutes). The transmitted data rate must likewise be on the order of 19 kilobits to support the protocol and message format described herein. Also, using very short duration time slots is an important factor in improving reception reliability in very high frequency paging systems, as further discussed in Section 4.4.

The message packet shown in FIG. 5C is generated as described in the previous section, starting with transport data 605. The following description of the message packet is arranged in the order in which it is built up. Each watch pager or receiver is assigned a unique serial number. Referring to FIG. 5C, the address field within a packet includes first and second fields, 608, 610. Ordinarily, for a single packet intended for an individual receiver, the address field matches the address of the receiver. For a specified group of receivers, e.g., firemen, only a specified portion of the packet address need match the addresses of the receivers assigned to the group. The second address field is discussed next.

Second address field 610 contains the most significant 16-bits (MSB) of the receiver's address, which correspond to the first part of the receiver's serial number. The first of these most significant bits indicates whether the message is for a group of receivers (1) or for an individual receiver (0). For Group receivers, the remaining 15-bits correspond to the Group number. For individual receivers, these bits constitute a part of the individual receiver's address (which is its serial number), of which the remainder is provided by address field 608. Individual receivers with different most significant bits can thus share the same time slot and subframe. A power-limited receiver will turn on briefly during its assigned time slot and subframe(s) to detect if its full address matches that address in the packet. If it does so, it will remain on to accept and process the data in the packet. If it does not, it turns off until the arrival of a control packet in the subframe immediately preceding its assigned subframe. Receivers, of course, could be designed to turn on more often, up to once every 14.0625 seconds. As further discussed below, the control packet indicates, to the receiver, time, date and other system information including a list of possible frequencies to use before turning on again at its assigned subframe and time slot.

A non-power-limited receiver (not shown) can monitor all packets transmitted. Receivers of a specific assigned group (e.g., receivers monitoring stock market reports) will detect packets having a matching group address. These packets, which carry group messages, can arrive in any time slot not carrying messages for another receiver. Thus, a full power receiver is required in most cases to receive group messages (except Group Zero, as explained in Section 3.7) on a regular basis.

First address field 608 contains the least significant 16-bits (LSB) of a receiver address corresponding to a first portion of a receiver's assigned serial number. For an individual receiver being sent a single packet, the least significant or lower 10-bits of packet address field 608 correspond to an assigned time slot number and to the least significant 10-bits of the receiver's address. The remaining or upper 6-bits of field 608 are ordinarily used to identify to the receiver one or more subframes, depending on how many of the bits are masked by the receiver. These 6-bits also match a corresponding portion of the individual receiver's address and, for a receiver that normally turns on once each frame, corresponds to subframe number. If one bit of the upper 6-bits is masked, the subframe number, as interpreted by the receiver, recurs every 32nd subframe. If two bits are masked, the subframe number recurs every 16th subframe, so the individual receiver turns on twice each frame. When a group message is transmitted, field 608 contains the subframe number and time slot number in which he message is transmitted.

3.3 Linking and Chaining of Messages

The packet assembly field 612 shown in FIG. 5C allows a watch receiver 840 to receive packets more often than just once every 7.5 minute frame. The transport data field 605 is sized to carry messages of a minimal length, e.g., Call 503-234-5678. Longer messages are broken into packets that will fit into the transport data field for transmission, and then reassembled by the receiver. Use of the packet assembly field as next described enables the system quickly to complete the message to a particular receiver.

Packet assembly can take two forms: a chain of linked packets and a sequence of packet chains. In a chain, the address of the next time slot for receiving a packet in the chain can be computed from an 8-bit continuation number (CONT NUMBER) within the packet assembly field 612 of the last packet. In a sequence of chains, the continuation number in the last link of the chain indicates whether one or more chains follow. If more chains follow, the first packet in the following chain starts in a subsequent subframe at the time slot corresponding in number to the time slot address of the receiver to which the message is directed. For example, referring again to FIG. 5B, assume the time slot 0 corresponds to the lowest 10 bits of the receiver's address. A chain could then be formed between time slot 0 and time slot 1 in subframe 3. A subsequent chain sent to the same receiver would start at time slot 0 in, for example, subframe 15.

A chain is formed by setting the start-of-chain bit (SOC) to 1 in a packet transmitted during the receiver's assigned subframe(s) and time slot. The address of the time slot for the next packet is given in CONT NUMBER. If the SOC bit is 0, it indicates the packet is not the start of a chain. In this case, a chain is in progress and the 16 most significant bits of the address are not sent because the receiver has already locked onto the chain through CONT NUMBER. The space resulting from omission of the most significant bits may be filled with message data.

Without the most significant bits, however, receivers that are assigned to the preempted time slot will pick up the packet unless they are directed not to do so. This direction is accomplished by the receivers looking at the SOC bit. If SOC is 0, then no receiver should accept the data unless previously directed to do so by a previous packet's CONT NUMBER.

The SOC bit is followed in the packet assembly field 612 of FIG. 5C by an end-of-chain bit (EOC). If set to 1, this bit indicates that the packet is not continued to another time slot but rather is the end of a chain. If set to 0, the EOC bit indicates that the chain is continued by another packet in a later time slot calculated from the CONT NUMBER.

The third bit in the field is the end-of-message bit (EOM). If set to 1, it indicates that this packet is the end of the message and that the receiver can display the message. A 1 does not, however, indicate that there are no additional packets coming, because a number of messages can be sent in a chain. If set to 0, it indicates that this packet is part of a message requiring further packets to be completed.

The next 5-bits are a modulo 32 count of the number of messages sent to a particular receiver. Each message is numbered and the next message number is the previous message number plus 1. This count allows a receiver to determine if it has missed a message, if a message is new, or if the message is a repeat of a prior message.

The last 8-bits in the field are the continuation link bits, forming the above mentioned CONT NUMBER. These bits give the offset or link number, up to 256 time slots away, to the next time slot if a chain is being formed. If a chain has ended, as indicated by the EOC bit being 1, CONT NUMBER provides a start of sequence bit (SOS) and the number of chains remaining in a sequence of chains The most significant bit of the continuation bits is the SOS bit. The remaining 7-bits designate the number of chains remaining. If the SOS bit is 1, it indicates that the present chain is the first in a sequence of chains. If the SOS bit is a 0, it indicates that the present chain is not the first in a sequence. By reading the SOS bit, a receiver can detect whether it has missed a chain in a sequence and must retrieve the missing chain upon its second transmission by transmitting facility 44. If the last seven bits are set to 0, CONT NUMBER thus indicates that no further chains remain in the series and that the receiver should turn off until the arrival of the control packets preceding its assigned time slot and subframe(s).

3.4 Example of Chained Messages

Figure 5D:
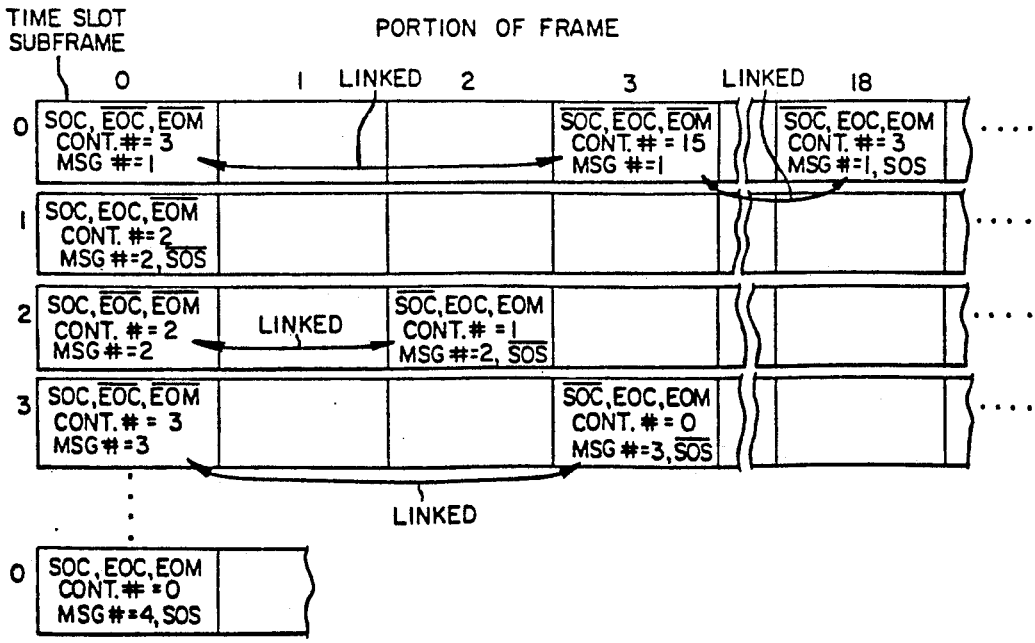
FIG. 5D (on sheet 11) is an example of a series of messages transmitted in a chain of packets and a sequence of chains.

The operation of packet assembly is shown by example in FIG. 5D with only the packet assembly field shown for clarity. A watch receiver whose assigned subframe and time slot address is, for example, 0/0 receives a first packet of a three-packet chain forming a first message. The packet assembly field will then appear in subframe/time slot 0/0 as shown in FIG. 5D. The SOC bit indicates the beginning of a chain, the $\overline{EOC}$ indicates the chain is not ended, and the $\overline{EOM}$ bit indicates a message is not ended. The CONT NUMBER indicates the offset or link to the next time slot in which the second packet in the chain will be transmitted. The message number indicates the number of messages, being 1 in the first chain. The receiver reads this data along with the rest of the packet data, turns off, and then turns on at linked time slot 3 in subframe 0. Receiving the second packet, the receiver again reads the packet assembly field, which indicates the chain is now in progress ($\overline{SOC}$, $\overline{EOC}$, OM/ ) and that an additional packet will follow 15 time slots away (time slot 18). After processing the second packet, the receiver again turns off until just before time slot 18, and then turns on to read the packet in that linked time slot. In time slot 18 the packet assembly field ($\overline{SOC}$, EOC, EOM) indicates the end of the chain and end of message, so that the watch 20 can store or display the entire message. At the end of a chain (EOC), the CONT NUMBER indicates the number of chains following in a sequence of chains, rather than the offset to the next packet in the chain. In the illustrated example, three chains follow.

The next chain and message begins at time slot 0, the receiver's assigned time slot, in the following subframe, subframe 1. The packet assembly field in the packet of subframe/time slot 1/0 indicates a one-packet chain with only a portion of a second message, as indicated by the $\overline{\text{EOM}}$ bit. Two more chains still follow, as shown by the value of the continuation number. The SOS bit indicates this chain is not the first chain in a sequence. If the receiver had missed the first chain, the $\overline{\text{SOS}}$ bit in the present chain would indicate to it that the receiver had missed a chain, and the receiver would then detect and store the first chain on its retransmission. The receiver reads the packet in time slot 0 and then turns off until time slot 0 appears again in the next subframe, subframe 2. At that time, it again turns on, reads the packet assembly field, and determines from the $\overline{\text{EOM}}$ bit that the 2/0 packet is the first of a multi-link chain which will be transmitted to it with the next packet arriving two time slots away. The receiver turns off, waits until that time slot, turns on and reads the packet assembly field to assemble a second message. The field in time slot 2 indicates the end of the chain and the end of the second message, whereupon the entire second message can be stored or displayed.

The CONT NUMBER indicates one more chain, beginning in the following subframe, as before. The receiver then proceeds to receive the fourth chain at subframe/time slots 3/0 and 3/3 and then stores or displays the third message. At the end of the last chain, in the CONT NUMBER, SOS is set to 0 ($\overline{\text{SOS}}$) and the number of chains remaining is set to 0, indicating the end of the chain sequence. The receiver then turns off and waits until its assigned subframe and time slot 0/0 arrive in the following time frame.

3.5 Error Checking and Correction

As shown in FIG. 5C and Table 1, the network layer protocol also involves error checking and correcting code (ECC). Such code is inserted within the address fields 608, 610 and the packet assembly field 612 to check for and correct errors in transmission of the data. The ECC used in this embodiment comprises 4-bits of Hamming code for each byte of data. An octet byte comprising two 4-bit Hamming codes is inserted after each two octets of data. Error checking and correction is carried out in conventional fashion.

3.5 Flags and Forced Zero Bit Insertion

At the link layer of the model in Table 1 and FIG. 2C, protocol for flags 614 and a frame check sequence 616 are added to the N data from the network layer. This occurs within block 220 of queuing machine 40 in FIG. 4. Beginning and ending 8-bit flags consisting of 01111110 are inserted at the beginning and end of each packet. The frame check sequence uses the standard high level data link control (HDLC) 16-bit polynomial. Padding of bits 618 may also be added to a packet to keep the frame 600 synchronized with real time.

The link layer protocol also includes zero bit insertion performed on the data between the beginning and ending flags to distinguish between the data in the packet and the flags. Unlike standard HDLC protocol, in this method a 0 is inserted in the data after a predetermined number of bits regardless of the value of the bits, for example, after every 5-bits where the flags includes a series of six ones. This technique improves over prior zero bit insertion methods such as in the X.25 protocol, in which a 0 is inserted after every five 1's in a field. By using a zero bit insertion after every five bits, errors in the transmission can be corrected with this scheme. In contrast, data dependent zero bit insertion is not readily correctable in an error prone transmission.

At the physical layer, the protocol determines the mode of transmission, such as a cellular radio link or FM side bands. Within FM transmission, the data rate is 19,000 bits per second, permitting each packet in FIG. 5C to hold up to 260 bits. The details of transmission are discussed in a following section.

3.7 Control Slots

Referring back to Table 1 and to FIG. 5B, system control information provided by the clearinghouse is transmitted by packet in three control slots 606 at the beginning of each subframe 602. This information directs the receiver to a system and a channel for receiving the following packets that contain message data.

All receivers can receive control packets, since these packets are Group Zero (see Table 2) and all receivers, including individual power-limited receivers, are members of Group Zero. Control packets have the same format as data packets 604, as shown in FIG. 5C, but always have the subframe number in bits 10–15 of the first address field, as contrasted with the data packets which contain a portion of the receiver address at that location. As discussed previously, the number of subframes that a receiver will turn on in a frame can be varied by masking and unmasking bits within bits 10–15. Also, the control packets include the same packet assembly data, so that the above-described capability of linking packets (see Section 3.3) can be used to connect control packets together, either within a subframe or from one subframe to the next, or even to continue to send control information in time slots 614. This capability enables much control information that does not change within the duration of a frame to be distributed over the entire frame in a small number of control pckets in each subframe.

The first control packet in each subframe uses binary coded decimal (BCD) for its transport data which comprises a system identification number of the local clearinghouse (four BCD characters), the month and day of the month (six BCD characters), and the 24-hour time (7 BCD characters) to synchronize the clock within watch 20. The first packet also includes a status counter modulo 10 (1 BCD character). Each time the system information as modified (described below), this counter is updated so that receivers may detect a change in the transmission system. The data content of the first control packet ordinarily remains constant except for time of day, until new system information is input.

In the second and third control packets, binary code is used to provide information on system characteristics, such as the number of systems in an area, how the addresses of groups and individual receivers are relocated to the various systems, and the number of channels in a tuned system. In large, densely populated areas, it may be necessary to have several systems for the individual addressed receivers. The proper system for a given receiver is determined by two 4-bit numbers within the control packet. The bit fields of each of these numbers correspond to bits 19 through 16 of the serial numbers on an individual addressable receiver.

These two 4-bit numbers determine how the addresses of various receivers are assigned to each system in an area. The first of the 4-bit numbers acts as a mask, ANDED with bits 19 though 16 of the receiver address to determine the number of systems into which an area is split. For example, a 0011 would mask the two significant bits and display a receiver's seven-most teenth and sixteenth address bits. These bits are then compared with a second 4-bit number which represents which of the systems in the area the receiver is currently receiving. If this number does not match the receiver's corresponding address bits, the receiver scans the frequency spectrum until it detects the transmission system having the corresponding bits. For example, if a system broadcasts a 0010 and the receiver's seventeenth and sixteenth address bits were 01, then the receiver will continue to scan until it locks onto the 01 system.

The second packet also contains the number of the channels in the particular system given in the packet. Binary encoding of each channel in the system is used. In the case of FM side bands, channel 1 is 76.1 MHz, channel 2 is 76.3 MHz, etc. The third packet can contain additional channel numbers. Once a receiver tunes to the system, the transmitter can send it to eight channel numbers in a control packet. It then scans the associated frequencies for a channel of sufficient transmission power and stores those frequencies in case the signal strength of the tuned channel drops too low for adequate reception by the receiver. The receiver will then tune to another of the frequencies associated with its system until it finds a channel of sufficient signal strength.

3.8 Protocol Decoding

As discussed above, a packet is transmitted to a particular receiver during a subframe and time slot in which the watch receiver will be activated. Each receiver will activate at least once a frame during its assigned time slot and may activate more often if so directed by a packet to detect a packet chain or sequence of chains. To better illustrate how the receiver detects a packet and decodes the protocol, its operation will be discussed in terms of state diagrams, a flow chart and a definition table in FIGS. 6A, 6B, 7A and Table 2 below. For convenience, the various message elements intended for a particular receiver are denominated in the first person as "My" address, subframe, time slot, etc The circuitry of the receiver that controls the next described operations will then be discussed in Section 3.9 with reference to FIGS. 10 and 11A.

Figure 6A:
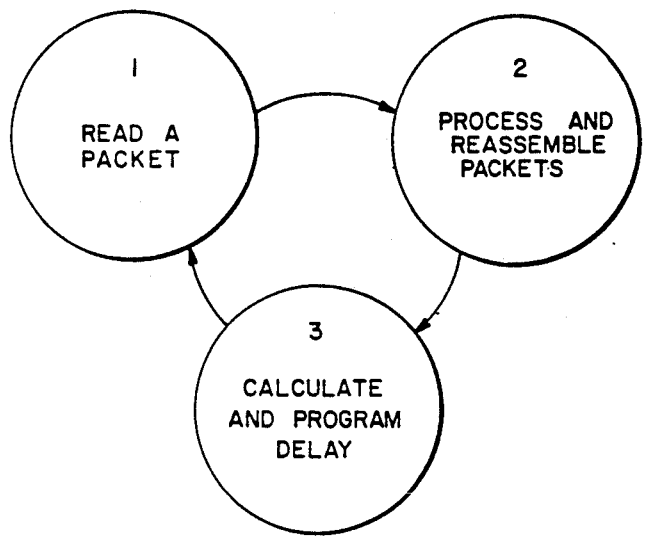
FIG. 6A is a state diagram of the operation of the receiver of the watch pager of FIG. 1A.
Figure 11A:
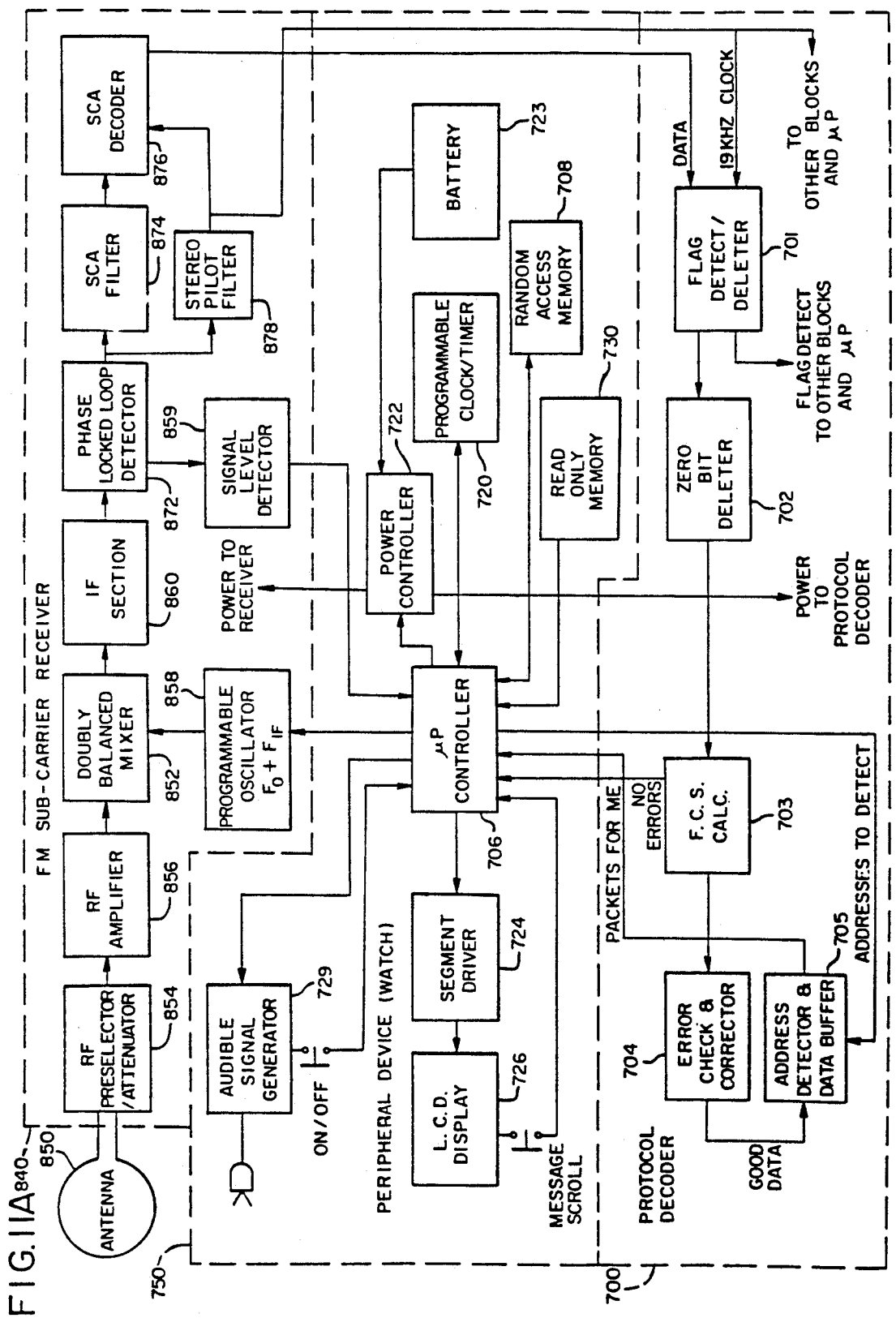
FIG. 11A is a more detailed block diagram of the receiver of FIG. 10.

Referring now to the state diagram of FIG. 6A, three circles are shown that represent the fundamental three processes in the receiver operation. The first process (circle 1) is to read a packet. The second process (circle 2) is to process and reassemble packets intended for the receiver The third or delay process (circle 3) is to calculate and program the delay time until the receiver should turn on again to pick up another packet. During the third process, the watch receiver 840 and decoder 700 of FIG. 11A are off to conserve power.

Figure 6B:
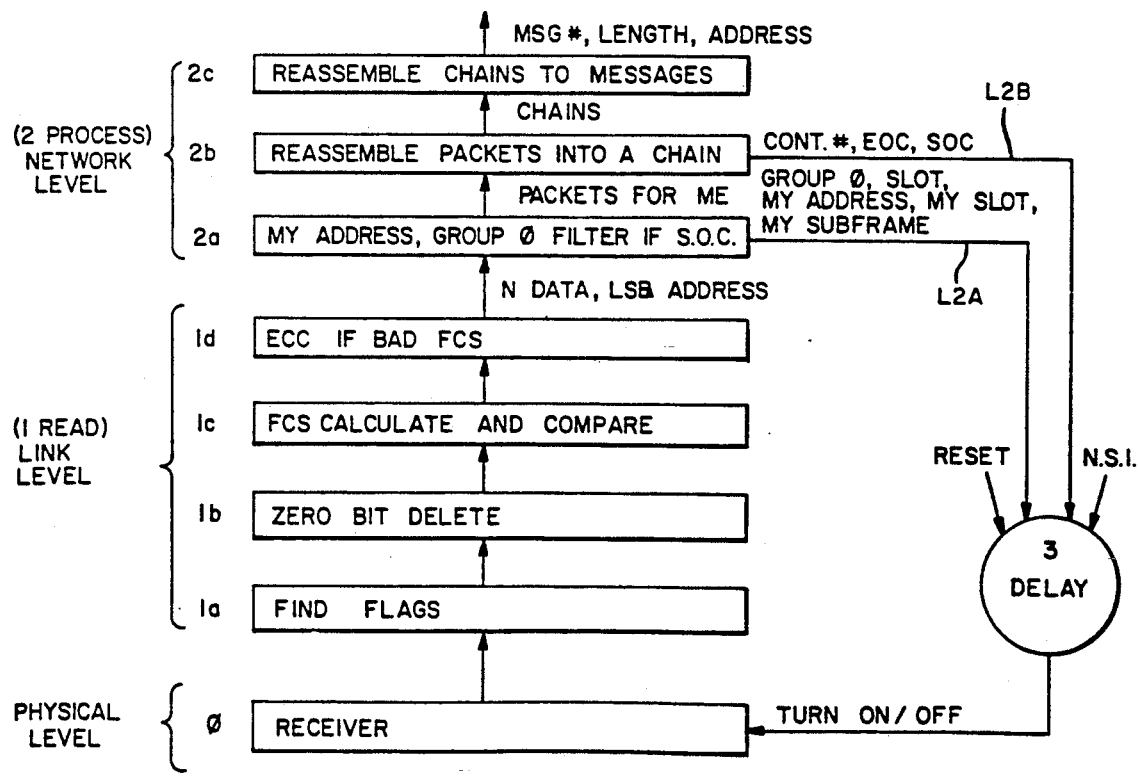
FIG. 6B is a flow chart showing the decoding within each circle of the state diagram of FIG. 6A.

FIG. 6B is a flowchart that expands on the processes of FIG. 6A, showing receiving of the packet at the physical level and decoding of the protocols at the link and network levels. Starting at the bottom of FIG. 6B, the packet is detected by the receiver (block 0). The packet is then checked for flags (block 1a). Zero bits are deleted (block 1b) from data between the flags. A frame check sequence (FCS) is then calculated and compared to the transmitted frame check sequence (block 1c). If the calculated FCS and transmitted FCS differ, then the ECC bits are used to correct the packet data if possible (block 1d). If not, the packet is discarded. A correctly transmitted or corrected packet is passed to the second process, which first checks the address of the packet and accepts the packet if it is for this receiver, i.e., "My Address" (block 2a).

Based on the information provided in each packet, the receiver decides in the delay state when to turn on again to receive another packet. For single packet messages, the receiver turns off and enters delay state 3 until its assigned subframe and time slot again appear, as indicated by line L2A. For multi-packet chains, the process continues upward to reassemble packets into a chain (block 2b) as discussed above. The receiver again turns off and enters the delay state 3 between time slots in which packets in the chain are transmitted according to the information on line L2B. Each time the receiver turns on and receives a packet, it proceeds upward through the physical level and link levels of FIG. 6B to block 2a at the network level. At that block, the determination is made whether the packet is "For Me." Chains formed at block 2b are then reassembled into messages (block 2c), and the messages are provided with a message number from the data and displayed.

Figure 7:
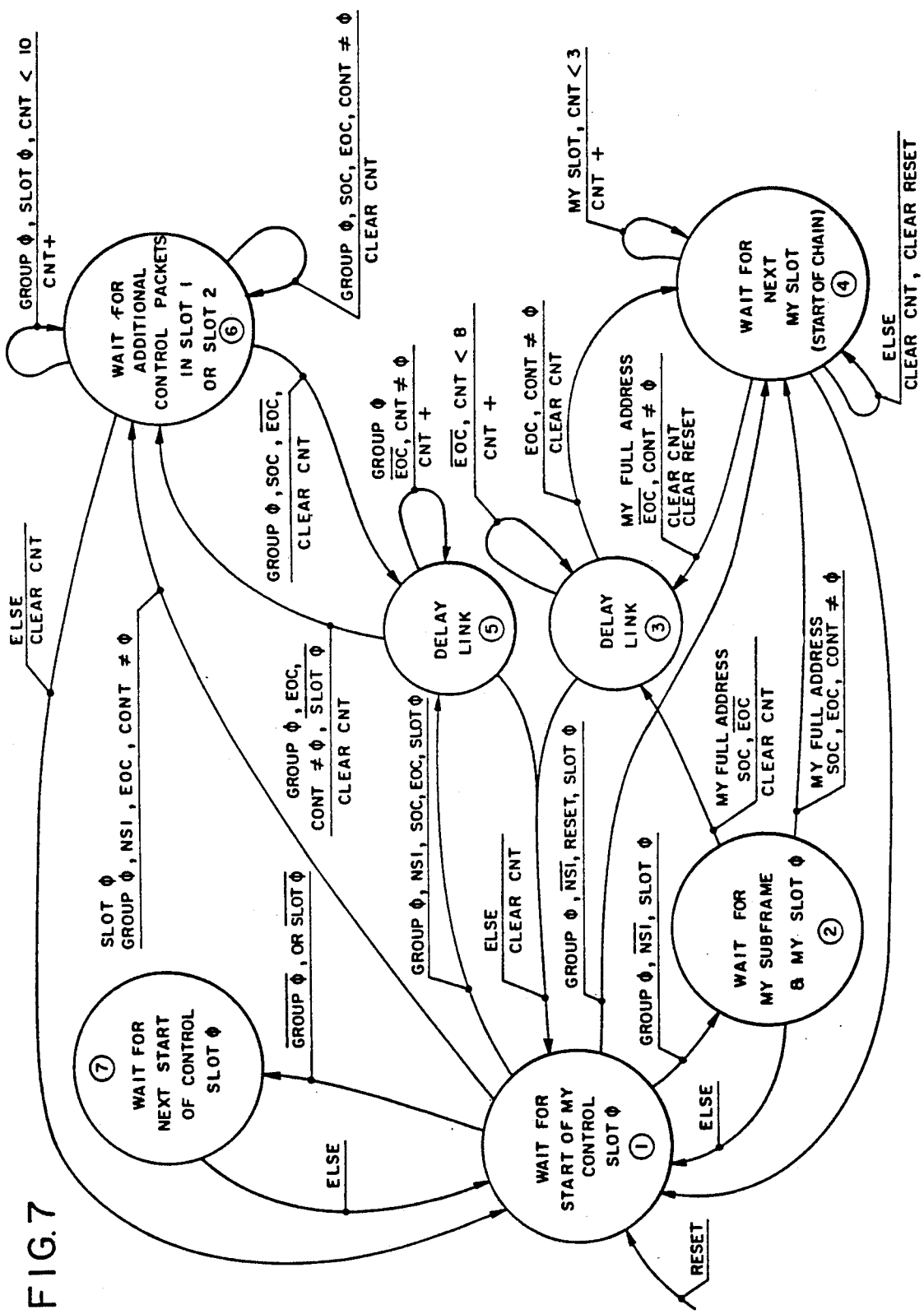
FIG. 7 is a state diagram showing the receiver operation within the delay state of FIG. 6A.

The operation of the delay process 3 of FIG. 6B is detailed in the state diagram of FIG. 7, with the data terms therein defined in Table 2. FIG. 7 also shows the delay process associated with finding a proper channel for receiving transmission from transmitting facility 44. In FIG. 7, the input data required to move the power-limited receiver to particular state is shown above the horizontal line connected to each linking arrow and the output generated in so moving is shown below the horizontal line.

TABLE 2

| DELAY STATE MACHINE SIGNAL DEFINITIONS | | |
|---|---|---|
| Signal Abrev. | Signal Name | Definition |
| SOC | Start of Chain | SOC bit true in current packet |
| EOC | End of Chain | EOC bit true in current packet |
| CONT. # | Continuation number | Indicates link value if not EOC Indicates chain number if EOC |
| NSI | New System Information | Indicates that the system update status counter or the system ID number has changed since the last control message was read. |
| GROUP 0 | Type Group Address = 0 | Control Packet MSB Addr 1000000000000000 |
| MY FULL ADDRESS | 32 bit addr. match | The full 32 bit address in the current packet matches the full 32 bit serial number of the receiver. |
| MY SUBFRAME | 6 bit addr. match with subframe number | Significant bits for this receiver of the current subframe number (calculated from information in previous control packets) match the receiver's serial number bits 10 through 15. |
| MY SLOT | 10 bit addr. match with slot number | Significant bits of the slot number obtained in the current packet match the receiver's serial number bits 0 through 9. |
| RESET | reset | Indicates that the reset button has been pushed for registration or battery replacement. |

TABLE 2-continued
DELAY STATE MACHINE SIGNAL DEFINITIONS

| Signal Abrev. | Signal Name | Definition |
|---|---|---|
| CLEAR RESET | clear reset | Reset operation is done. |
| CNT + | count increment | Counts the number of times in same state. |
| CLR. CNT. | clear count | Clear the counter contents when changing states. |
| ELSE | else | Path to take if no other path's conditions are met. |

3.8.1 Scanning and Initialization

Before entering state 1 of FIG. 7, a receiver must first find a proper communications channel. This step is necessary if the receiver has moved to a new area in which its assigned system has a different set of channels from those previously used or if the receiver is again being activated, such as by replacement of the battery. Upon activation, the receiver scans the frequency spectrum until it detects a channel carrying packet transmissions. It reads a packet in that channel to determine the relative location of a control packet, as described previously. It then reads the control packet to see if the system to which it is currently tuned is its assigned system. If it is not, the receiver continues scanning until it finds the proper system.

Once locked on to the proper system, the receiver enters state 1 and waits for the start of "My Control" slot 0, which is in the subframe preceding its assigned subframe. If, upon turning on, the receiver does not detect its control slot 0, it proceeds to state 7 to wait until the next start of control slot 0. In waiting states 1 and 7 and the other states in FIG. 7, the receiver and decoder sections are off to conserve power and turn on when commanded to do so as discussed in the following section.

Assuming the receiver turns on in state 1 to receive control information from a packet in control slot 0, it then proceeds to other states depending upon the content of that information. If the control information indicates new system information (NSI), the receiver proceeds to state 5 or to state 6 to wait for additional control information in control slots 1 and 2. Upon receiving it, the receiver again returns to state 1. Alternatively, "My Control" slot 0 may not indicate new system information, in which case the receiver proceeds to state 4 (upon RESET) or to state 2 to operate as next described.

3.8.2 Continuing State Operation

After receiving new system information, the receiver proceeds to state 2 and turns off to wait for "My Subframe(s)" and "My Slot" before turning on again. The receiver reads, from the packet transmitted during "My Subframe" and "My Slot" 0 (its assigned time slot in the example of FIG. 5D), the message data and information in the packet assembly field. Information in that field directs the receiver to move from state 2 either forward to one of state 3 and state 4, depending on whether a chain or a sequence of chains is indicated by the data input above the horizontal lines between states, or, if no further chain or sequence of chains is indicated, back to state 1 to wait for its assigned time slot again in the following frame.

State 3 is the delay link between packets in a chain. The receiver remains in state 3 so long as it continues to receive packets in a single chain. Once a chain ends, however, as indicated by the EOC being 1, the receiver proceeds either to state 4 if a sequence of chains is indicated by the continuation number or to state 1 if the continuation number indicates that no chains follow.

State 4 is the link between chains in a sequence of chains. The receiver can move to state 4 from state 2 directly if a sequence of single packet chains is being transmitted to it. Once in state 4, the receiver will stay there so long as single packet chains follow. If a chain has multiple packets, however, the receiver proceeds from state 4 to state 3, which is the delay associated with assembling the packets within a single chain. This occurs when the EOC bit is 0 and the continuation number is not 0. When the final packet in the final chain in a sequence is read, the receiver will proceed from state 4 or state 3 to state 1.

State 5 operates similarly to state 3 and state 6 similarly to state 4 to create chains and sequence of chains of control packets when required. During each of the foregoing WAIT states, the receiver circuit is turned off to conserve power.

3.9 Watch Receiver and Decoder Circuitry

Figure 10:
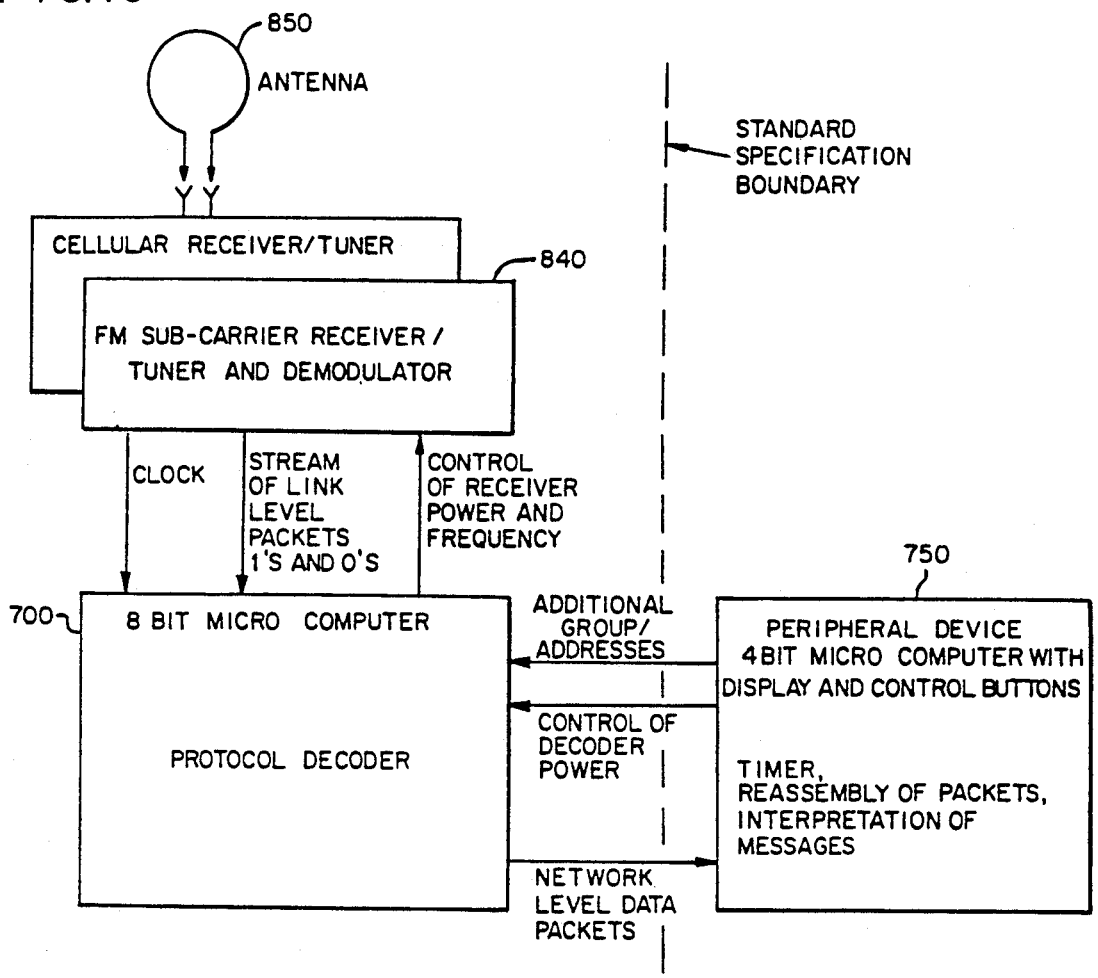
FIG. 10 is a block diagram of the receiver of the watch pager of FIG. 1A.

FIG. 10 shows a simplified functional block diagram of the internal electronics of watch pager 20, with each of the blocks shown in detail in FIG. 11. Packets are received and demodulated by FM subcarrier receiver/tuner section 840 that is described in detail in following Section 4.2. A protocol decoder 700 receives the data in digital form from receiver 840 and performs the operations described above in connection with FIGS. 6A, 6B and 7. Connected to the protocol decoder across a dashed line boundary is a peripheral device 750 which includes various external control and display features, and a timer which turns on the decoder 700 and receiver 840, in turn, at the end of each WAIT state of FIG. 7.

Referring to FIG. 11A, the receiver section 840 is tuned to the proper system and channel by a microprocessor 706 that scans the frequency spectrum according to a predetermined scanning procedure through programmable oscillator 858. When the receiver section 840 detects a stereo channel, a signal level detector 859 generates a signal to the microprocessor 706 to try to read data from that channel. If the channel does not carry data, the scan continues and the procedure is repeated until a channel is detected that is within a system matching the serial number of watch 20, as described previously. The microprocessor 706 then reads data from the subsequent control packets to obtain the list of channels within the system and stores the channel information in random access memory 708. As the signal strength varies, the microprocessor will tune to different channels within the system to maintain communication from the local clearinghouse.

With receiver section 840 properly tuned, the data emerge from an SCA decoder 876 in the digital packet form shown in FIG. 5C. This data is input to the protocol decoder section 700 of the watch 20 along with a 19 kilohertz clocking signal from a stereo pilot filter 878 to clock the data through the protocol decoder. The protocol decoder can be a conventional low power microprocessor or can be a custom-designed hardware device incorporating circuits performing the functions indicated by the blocks in section 700. The following description is directed to a hardware implementation of the decoder.

As described with respect to FIGS. 6A and 6B, the flags of the packet are detected and deleted in circuit 701 and the data is passed onto a zero bit deleter 702. The frame check sequence (FCS) is the calculated in circuit 703 and if an error is detected, the data is processed by an error check and corrector 704. If the errors cannot be corrected, the packet is not further processed and is discarded, as previously discussed. Assuming good data, the packet address is then compared in address detector and data buffer 705 to the receiver address supplied from ROM 730 by microprocessor 706. If they match, indicating a "packet for me," the packet data is routed to the microprocessor 706 within the peripheral device section 750 of watch 20. As shown in FIG. 10, the section 750 reassembles the packets to form messages, interprets the semantics of messages, and controls the supply of power from the battery to the various sections of the watch 20.

Referring again to FIG. 11A, section 750 includes a programmable clock/timer 720. The clock in clock/time 720 provides the current time, which the microprocessor updates with the time data it receives from control packets. For example, if the watch time does not match the transmitted time from a control packet, the microprocessor updates the clock with the transmitted time. The timer within clock/timer 720 times out the delay states for the watch receiver as described in FIGS. 6A, 6B and 7. Responsive to the timer, the microprocessor controls a power controller 722 that supplies power from the battery 723 to watch pager sections 700 and 840 when required.

Data decoded by the protocol decoder 700 is stored in random access memory 708 until it is to be displayed. The message can include a time of delivery. Information indicating reception of the message is routed by the microprocessor 706 through a segment driver 724 to a liquid crystal display 726. The microprocessor can also alert the user to the arrival of a message by sending a signal to an audible signal generator 729. Upon the user pressing the select button 82 of pager 20, the content of the message is displayed. Control routines for microprocessor operation are stored in read only memory 730.

As mentioned above, the system 22 verifies that the packets transmitted from the transmitter facility contain the correct information. Antenna 232 within queuing machine 40 in FIG. 4 receives the packets and routes them to verification receiver 45, which is similar in design to the receiver section 840 in FIG. 11, but operating continuously. The data in the received packets is then .verified in a comparison process 234 against the data in the corresponding transmitted packets of the data signal of circuit 220. If an error is detected, the packet is retransmitted.

4.0 Modulation Scheme

Figure 8:
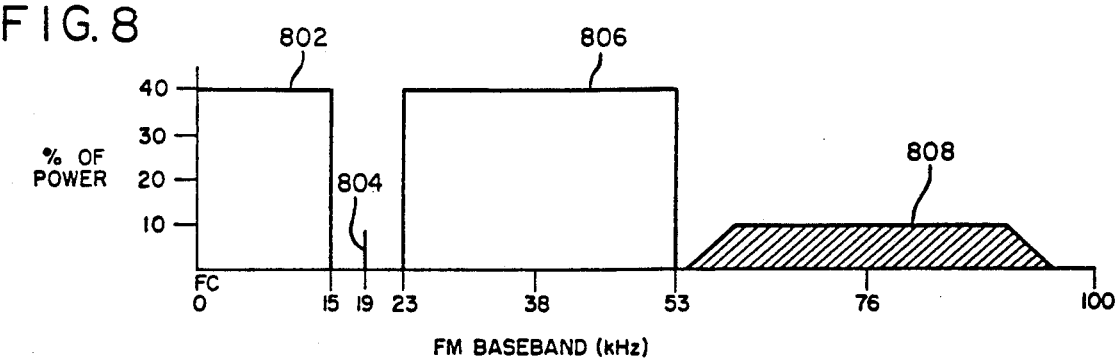
FIG. 8 shows the spectral components of the FM broadcast signal used in transmissions in the system of FIG. 2A.

FIG. 8 shows the spectral components of a wide band FM broadcast signal. For clarity, only the half of the signal extending above the center frequency, Fc, is shown. A signal 802 modulated with the sum of the left and right audio signals extends in the band from the center frequency to approximately 15 kilohertz. A stereo subcarrier signal 804 is sent at 19 kilohertz. A signal 806 modulated with the difference between the left and right audio signals extends in the band from 23 to 53 kilohertz. The FM broadcast information ends at 53 kilohertz, with the remainder of the channel, from to 100 kilohertz, normally being empty.

Part of the unused spectrum between 53 kilohertz and 100 kilohertz is used in the present invention to transmit an SCA signal 808. (SCA is an abbreviation for Subsidiary Communication Authorization, but is herein taken to mean any auxiliary transmission within the FM channel.) The SCA signal 808 is modulated with data packets which are sent from the FM station to a plurality of page receivers. This packet data is modulated on an SCA subcarrier of 76 kilohertz and occupies a bandwidth of 19 kilohertz about this frequency. Such bandwidth allows a data transmission speed of 19 kilobaud.

4.1 Transmitter Modulation

Referring to FIG. 4, digital data from the queuing machine 40 is input to a subcarrier generator, or modulator, 810 connected to the exciter 812 of an FM transmitter 44. The modulator generates the 76 kilohertz subcarrier signal which is modulated with the packet data (see FIG. 4).

Figure 13A:
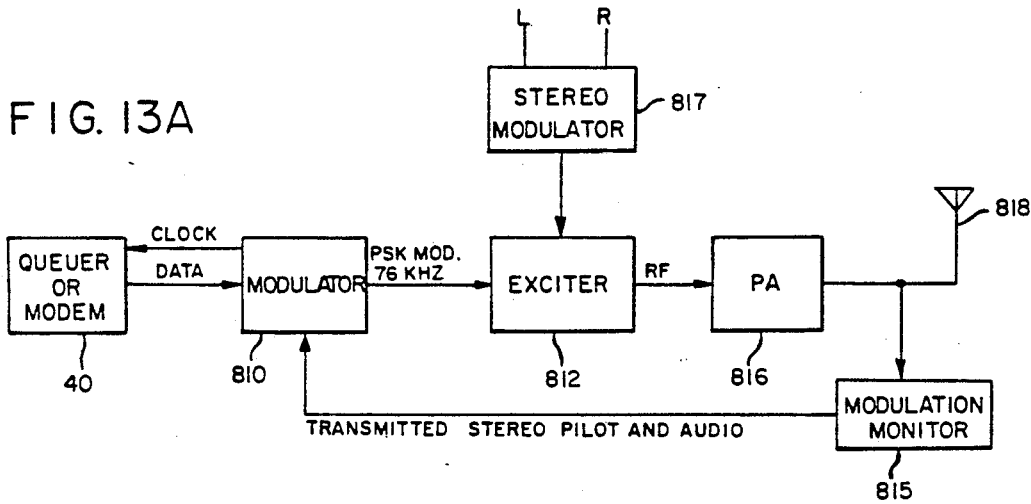
FIG. 13A is a more detailed block diagram of the transmitter facility of FIG. 4.

With reference to FIG. 13A, modulator 810 accepts 19 kilohertz data from queuer 40 and provides a corresponding bipolar (180°) phase-shift-keyed 76 kilohertz subcarrier to exciter 812, in-phase with the station's stereo pilot signal.

Modulator 810 also supplies a 19 kilohertz reference clock signal, having a fixed phase relationship to the stereo pilot signal, to queuer 40. A composite stereo base-band signal, including both audio modulation and stereo pilot, is provided to modulator 810 from the station's modulation monitor 815.

Phase shifts of the modulated 76 kilohertz signal take place over 3.5 cycles and are in such a phase relation with the station's stereo pilot signal that the zero-crossing, rising-edge on the stereo pilot signal is within plus or minus 22.5° of the center of each eighth half-cycle. Voltage samples taken at this zero-crossing edge yield a logic "1" if positive and a logic "0" if negative.

To minimize interference with normal FM broadcasts, the modulation products from modulator 810 between 0 hertz and 53 kilohertz are kept at least 45 decibels below the subcarrier level. Modulation products above 100 kilohertz are kept at least 60 decibels below the subcarrier level so as to comply with Federal Communications Commission requirements.

Figure 13D:
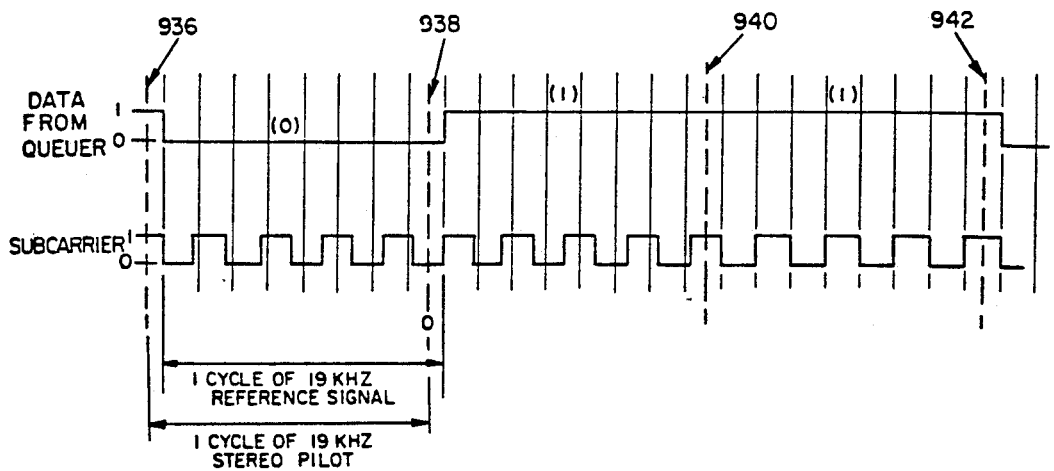
FIG. 13D is a timing diagram of waveforms in the modulator circuit of FIG. 13A.
Figure 13C:
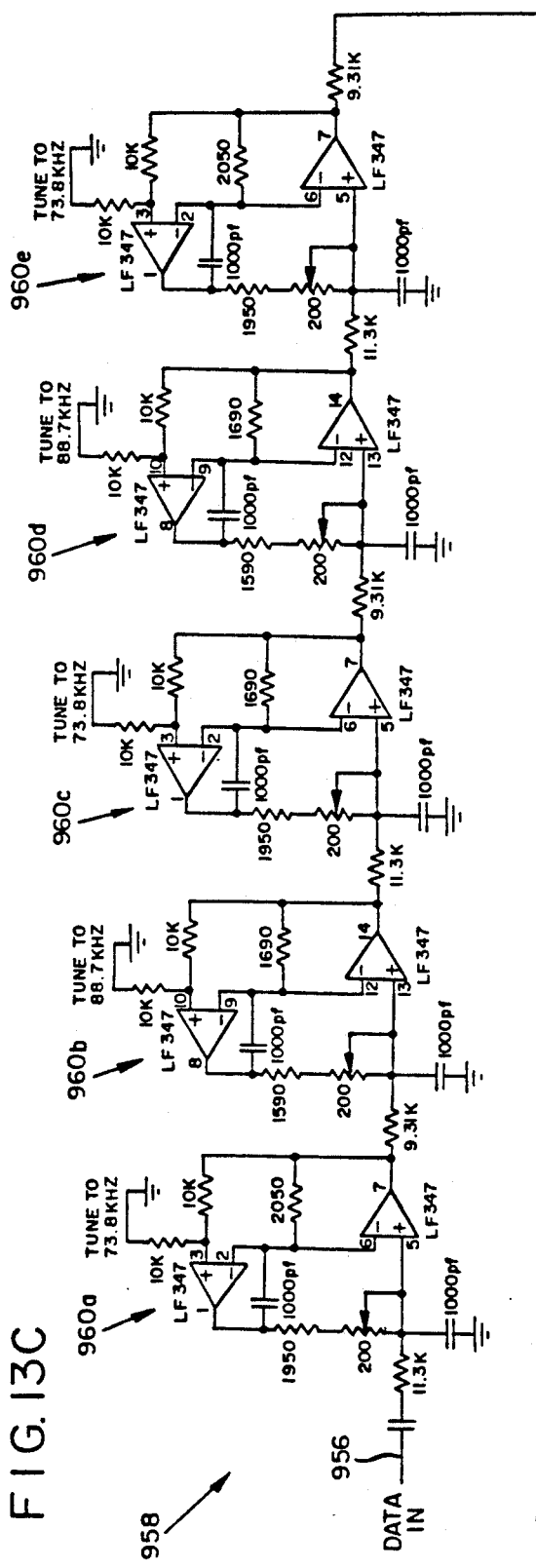
Figure 13C:
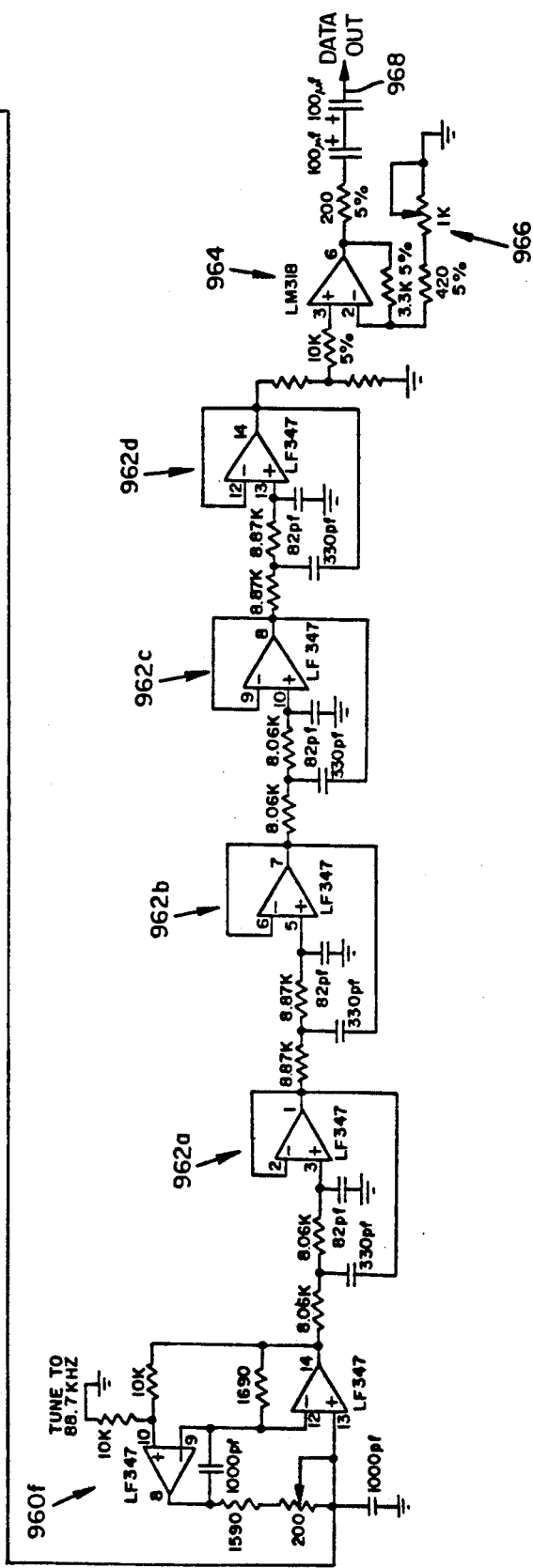

The circuit of modulator 810 is shown in schematic form in FIGS. 13B and 13C. The composite base-band stereo signal from modulation monitor 815 is fed to composite input port 902. An amplifier 904 and tuned circuit 906 couple the composite audio signal to a phase locked loop detector 908. Detector 908 strips off the audio components from the base band signal and provides the 19 kilohertz stereo pilot signal, shifted somewhat from its original phase, at output 910. The shifted 19 kilohertz pilot signal is squared up and brought to TTL levels by a pair of Schmitt trigger inverters 912. Exclusive NOR gate 914, configured as a quadrature phase detector, has one input connected to the 19 kilohertz stereo pilot and a second input 916 connected to the system's 19 kilohertz reference line 917. The signal on 19 kilohertz reference line 917 is derived from the output 919 of a 2.432 megahertz clock circuit 918 by a process described herein. Quadrature phase detector 914 produces an error signal that is provided to integrating circuit 920. Integrating circuit 920 provides a biasing signal to varactor 922 to vary its capacitance. The capacitance of varactor 922 tunes the frequency of oscillator 918 so that the frequency of the 19 kilohertz reference signal on line 917 (derived from output 919 of oscillator 918) is locked to the frequency of the stereo pilot. The phase relationship between the 19 kilohertz reference signal and the stereo pilot is also maintained at a fixed value.

Digital packet data is provided to a data input 924 of a signal shaper circuit 926 in modulator 810 from a data source, such as queuer or modem 40. Circuit 926 converts the RS232-C levels from input 924 to TTL levels compatible with the following stages. The data is then routed to circuit 928. Circuit 928 is an octal D-type flip-flop. Two of the flip-flop sections are connected together so as to generate two output signals, or state transition data, on lines 930 and 932, corresponding to the sequence of data being received at data input 924. The outputs from circuit 928 are as follows: If the input data changes from a 0 to a 1, output 930 will be a 0 and 932 will a 1. If the input data changes from a 1 to the 0, output 930 will be a 1 and output 932 will be a 0. If the input data does not change from a 0 value, outputs 930 and 932 will both be zero. If the input data does not change from a 1, outputs 930 and 932 will both be 1's.

Data output lines 930 and 932 are fed into two of the ten address lines of a PROM 934. PROM 934 is programmed to synthesize the appropriate subcarrier signals based on this state transition data. To best understand operation of PROM 934, a description of the precise modulation scheme follows.

One bit of data is transmitted each cycle of the 19 kilohertz stereo pilot signal. The receiver determines the status of each transmitted bit by sampling the phase of the subcarrier at the zero-crossing, rising-edge of the stereo pilot signal. The sampled phase for bits 1 and 0 are shown in FIG. 9B. If two consecutive bits of data are identical, either both 1 or both 0, the phase of the subcarrier does not change during the intervening cycle of 19 kilohertz stereo pilot. For example, in the solid line subcarrier waveform shown in FIG. 9A, the subcarrier has the same phase at both zero-crossing, rising edges of the 19 kilohertz stereo pilot. The data bit at both zero-crossings is a data "1," as shown in the phase diagram in FIG. 9B.

Figure 9A:
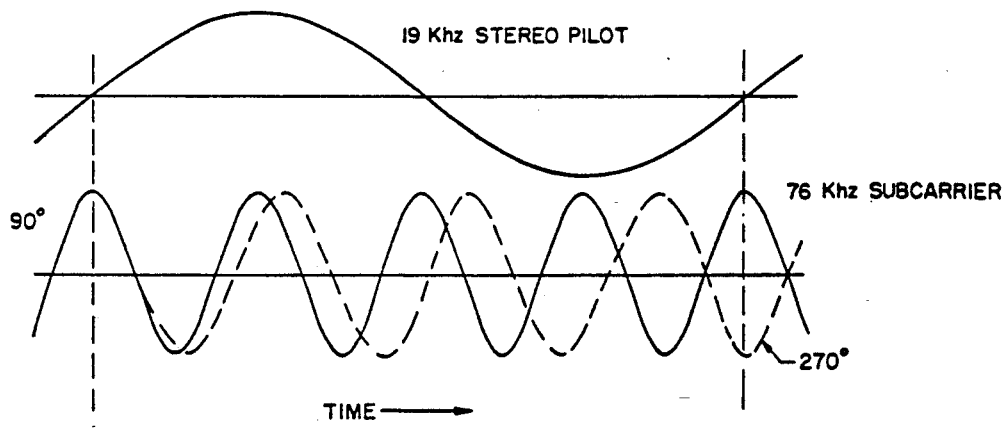
FIGS. 9A and 9B are waveform diagrams of the transmission scheme of FIG. 8.

If the data bit changes sequentially from a 1 to a 0, the subcarrier waveform would appear as shown in dashed lines in FIG. 9A. At the first zero-crossing, rising-edge of the pilot, the subcarrier indicates a data 1. Thereafter, the phase of the subcarrier is gradually changed so that at the next zero-crossing of the pilot, the subcarrier indicates a data 0. This phase shift may be accomplished either by retarding or advancing continuously the phase of the subcarrier.

The waveforms shown in FIGS. 9A and 9B are those transmitted with the broadcast signal. They are generated, however, as square waves, and become sinusoidal when they pass through the modulator's filter sections.

A representation of the data signal within the modulator is shown in FIG. 13D. Just after time 936, the data from queuer 40 changes from a 1 to a 0. The preceding 1 state is signified by the 1 state of the subcarrier when sampled at time 936. Because the data changes from a 1 to a 0, the phase of the subcarrier at the next zero-crossing of the pilot signal (time 938) must change from a 1 to a 0 state. This change is effected by advancing the phase of the subcarrier slightly each cycle so that 4.5 cycles of the subcarrier are transmitted during a single cycle of the pilot. (Normally, four cycles of the 76 kilohertz subcarrier are transmitted during a single cycle of the pilot, as shown in FIG. 9A.) The extra half cycle squeezed into the 19 kilohertz period causes the subcarrier, when sampled at time 938, to be 0.

The same conditions hold for the following cycle of 19 kilohertz stereo pilot, from time 938 to 940. In this instance, the transition is from a 0 to a 1. The phase of the subcarrier continues to advance, so that another 4.5 cycles are transmitted during the single cycle of the pilot The extra half cycle allows the subcarrier to advance to a 1 state at time 940.

There is no data transition during the next cycle of the pilot, between times 940 and 942. The data remains in the 1 state. In such instance, the subcarrier reverts to its non-phase shifted 76 kilohertz signal. Four complete cycles of the 76 kilohertz subcarrier are transmitted during this cycle of the pilot between times 940 and 942, so that the state of the subcarrier is the same (1) at both of these times.

Returning to the schematic of FIG. 13B, modulator 810 examines the transitions between consecutive data bits and manipulates the phase of the subcarrier so that its state, sampled at the zero-crossing, rising-edge of the stereo pilot, corresponds to the state being transmitted. If two consecutive data bits have the same state, the modulator sends an unshifted 76 kilohertz signal, so that its phase at the beginning of the pilot cycle is the same as its phase at the end of the pilot cycle. If, however, consecutive data bits have differing states, modulator 810 progressively shifts the phase of the subcarrier so that by the next zero-crossing of the pilot, it will assume a phase opposite of the phase it started with.

The above synthesis of the subcarrier waveform is performed by PROM 934. PROM 934 is a 1024×4-bit memory device driven by sequencer circuit 944. Sequencer circuit 944 repetitively counts from 0 to 255. This binary count is applied to eight of the ten address lines A0 to A7 of PROM 934 and causes PROM 934 to sequentially provide 256 4-bit bytes to its four outputs 946 which are applied to latch circuit 948. Each of the four output lines at outputs 946 corresponds to a different signal. These signals are synthesized by sequencing through the data stored in PROM 934 in very short time increments, corresponding to the period of the 2.432 megahertz clock. Depending on the contents of PROM 924, the output signal is either a 19 kilohertz signal, a 76 kilohertz signal, the data output signal or a load control signal.

The 19 and 76 kilohertz reference signals, on output lines 917 and 952 of latch circuit 948 are easiest to visualize. For the 19 kilohertz signal, the 256 bits of data stored in PROM 934 comprise 64 consecutive 1's, followed by 64 consecutive 0's, followed by another 64 consecutive 1's and another 64 consecutive 0's. When sequentially read out from PROM 934 at the 2.432 megahertz rate, this data forms a 19 kilohertz square wave signal on line 917. Latch 948 is interposed between PROM 934 and the output data lines 954 to eliminate noise during state transition in the PROM.

Synthesis of the 76 kilohertz reference signal on line 952 proceeds similarly. PROM 934 is programmed with alternating strings of sixteen 1's and sixteen 0's throughout its 256-bit length addressed by sequencer circuit 944. When read out at the 2.432 megahertz rate, a 76 kilohertz square wave signal is produced.

The load pulse on line 950 is generated by a single 1 in one of the PROM locations, together with 255 0's. When read from PROM 934, the load pulse clocks flip-flop 928, thereby causing it to respond to the next bit of incoming data.

The data on output line 956 is the modulated subcarrier. The data read from PROM 934, however, depends on the state of outputs 930 and 932 of flip-flop 928, which in turn depend on the transition between successive incoming data bits, as discussed above. If lines 930 and 932 are both 0 or are both 1, the data has not changed state from its previous value. In such case, PROM 934 is programmed to output a 76 kilohertz square wave as the data output. If, however, the state of lines 930 and 932 are different, indicating a 0 to 1 or a 1 to 0 transition in the input data, PROM 934 is programmed to synthesize a waveform that gradually advances or retards the phase of the subcarrier signal, as discussed above, so that at the next sampling point, the instantaneous value of the subcarrier will be opposite its preceding value.

The data stored in PROM 934 to synthesize this changing phase signal may assume many forms. In the preferred embodiment, the phase is changed gradually during the course of a 19 kilohertz cycle with small incremental phase shifts occurring throughout that period. PROM 934 is loaded with alternating 14-bit strings of 1's and 0's. In other embodiments, however, the shape of the subcarrier output may be synthesized using bit strings of other lengths. The preferred embodiment was selected so as to minimize the extraneous frequency components of the subcarrier, and thereby simplify the following filtering circuitry.

The 19 kilohertz reference signal on line 917 is frequency locked to the stereo pilot signal and has a fixed phase relationship thereto. This 19 kilohertz signal is applied to clock output 957, which provides the reference signal to queuer 40.

The position of the modulation data within PROM 934 is selected so as to synchronize the modulator with the stereo pilot. The modulator operates with a 19 kilohertz reference signal on line 917 that is phase delayed relative to the pilot. The PROM may be programmed so that the modulation is delayed relative to the reference signal, so that it is 360° behind, or in phase with, the pilot.

The synthesized data, or subcarrier, is fed from line 956 on FIG. 13B to the filter network 958 shown in FIG. 13C. Filter 958 comprises six sections 960 of bandpass filtering centered about 81.25 kilohertz. Successive sections are alternately tuned to 73.8 kilohertz and 88.7 kilohertz to effect the needed bandwidth about this frequency. The center frequency of filter 958 is skewed up to 81.25 kilohertz to reflect the phase shifting of the subcarrier. When unshifted, the subcarrier has a frequency of 76 kilohertz. When the phase is gradually advanced to effect a change of state at the sampling time, the subcarrier has a frequency of 85.5 kilohertz. Bandpass filter sections 960 prevent interference with the broadcast audio in the FM signal.

Active bandpass filter sections 960 are followed by four active low-pass filter sections 962. Filter sections 962 are employed to reduce modulation above the FM channel edge to well below FCC standards.

An amplifier 964 with adjustable gain control 966 is used to set the output level of the subcarrier supplied to exciter 812 on subcarrier output line 968.

Returning to FIG. 13A, FM exciter 812 receives the modulated subcarrier from modulator 810 and receives the stereo audio and stereo pilot from a stereo modulator circuit 817. The exciter generates a low level RF signal including these component signals to a power amplifier 816. Power amplifier 816 supplies the amplified RF signals to an FM transmitting antenna 818 for broadcast. Also connected to the output of amplifier 816 is the station's modulation monitor 815. Modulation monitor 815 provides an output having the base band signals carried by the RF carrier. These base band signals are fed back to the modulator, as described above. It is through this route that the 19 kilohertz stereo pilot is made available to modulator 810.

In an alternative subcarrier generation scheme, the 19 kilohertz pilot may be directly multiplied up to 76 kilohertz by a frequency multiplier stage (not shown). The 76 kilohertz subcarrier may then be modulated with the incoming data.

The illustrated embodiment is preferred because the subcarrier generation simultaneously synthesizes the modulation using programmed waveforms. By this technique, the transmitted waveforms may be tailored to generate a desired spectral distribution. The illustrated modulation scheme minimizes spurious modulation components, thereby simplifying the associated filtering circuitry.

4.2 Receiver Demodulation

A block diagram of the receiver section 840 used in the present invention is shown in FIG. 11A. The received FM signal is fed from an antenna 850 (described below) to a mixer 852 through an RF preselector/attenuator circuit 854 and an RF amplifier circuit 856. RF preselector/attenuator circuit 854 provides some attenuation of out-of-band signals, while amplifier 854 amplifies the received signals so as to minimize the receiver's noise figure. Preselector circuit 854 may also serve to resonate antenna 850. Mixer 852 mixes the desired FM broadcast signal received by antenna 850 with a local oscillator signal from a programmable local oscillator 858. Mixer 852 is desirably doubly balanced. Local oscillator 858 is a frequency agile, digitally synthesized oscillator controlled by microprocessor controller 706. The frequency of programmable oscillator 858 is controlled, in accordance with the previously described scanning procedure, to produce an up-converted first intermediate freqency (IF) of 384 megahertz.

Figure 11B:
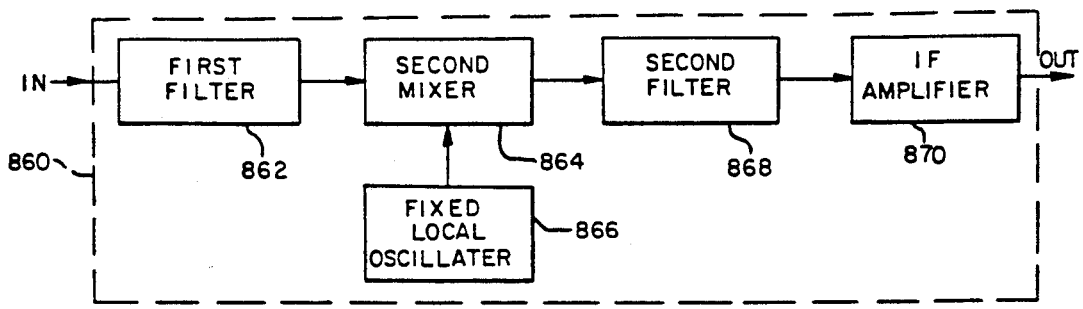
FIG. 11B is a block diagram of the IF section of the receiver as shown in FIG. 11A.

The output from first mixer 852, including the 384 megahertz IF, is fed to an IF section 860, detailed in FIG. 11B. IF section 860 includes a first filter 862 which passes the desired 384 megahertz signal and rejects the unwanted mixer products. In the preferred embodiment, filter 862 comprises a SAW (Surface Acoustic Wave) filter. The output from filter 852 is fed to a second mixer 864. Second mixer 864 mixes the signal from filter 862 with the signal from a second local oscillator 866. Second local oscillator 866 generates a fixed frequency of 394.7 megahertz, thereby yielding a down-converted second receiver intermediate frequency of 10.7 megahertz. The output from second mixer 864 is fed to a second filter 868 which attenuates the undesired mixer products and passes the 10.7 megahertz signal to an IF amplifier circuit 870. Second filter 868 can be a standard 10.7 megahertz ceramic filter of the type commonly used in FM receivers.

The dual conversion system adopted in the present invention allows the receiver size to be reduced substantially. If a single conversion system with a 10.7 megahertz IF were used, the associated filter would have to be quite large. Many poles of filtering would be required to achieve the desired passband shape. In the present system, by contrast, the desired passband can be achieved, in large part, by the very small 384 megahertz SAW filter 862 (having approximate dimensions of 1 mm by 2 mm). This SAW filter provides the desired 250 kilohertz passband, with out-of-band rejection of approximately 40 decibels. Second filter 868, the 10.7 megahertz ceramic filter, comprises just a few sections and is used merely to further attenuate the out-of-band rejection.

In the preferred embodiment, all circuitry between antenna 850 and second filter 868 is formed in a single gallium arsenide (GaAs) integrated circuit. Even SAW filter 862 may be formed in this manner since gallium arsenide is an electro-acoustic medium. GaAs is preferred because of its very low noise characteristics. However, other technologies, such as silicon circuitry in discrete or integrated form, can be used.

IF amplifier 870 amplifies the 10.7 megahertz signal from filter 868 to a level suitable for detection by a phased locked loop detector circuit 872 (FIG. 11A). Detector 872 demodulates the IF signal and provides a wide band composite audio signal to an SCA filter 874 and a stereo pilot filter 878. Associated with detector 872 is a signal level detector 859 which provides to microprocessor controller 706 an output signal indicative of the received signal strength. The controller monitors this signal and scans for a new channel when the strength drops below a threshold value.

Figure 14:
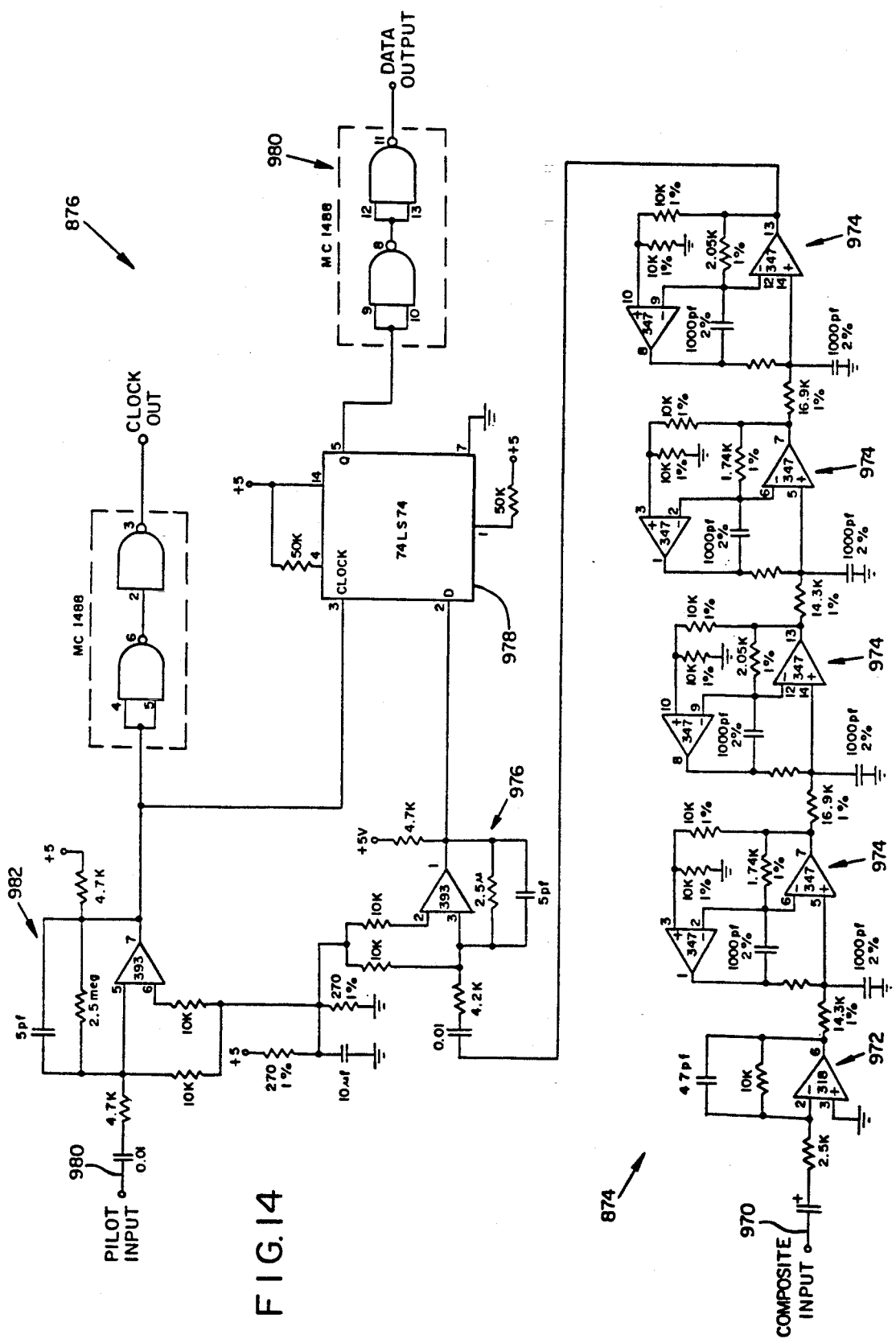
FIG. 14 is a schematic of the SCA decoder section of FIG. 11A.

SCA filter 874 and SCA decoder 876 are shown schematically in FIG. 14. SCA filter 874 passes the desired SCA channel to SCA decoder 876, while attenuating the lower frequency audio components. Decoder 876 demodulates the filtered SCA channel and provides 19 kilobaud packet data to the packet decoding circuitry. The composite audio from phase locked looped detector 872 is provided to input 970 of filter 874. An amplifier 972 further amplifies the composite signals and applies them to four active filter stages 974. Filters 974 are centered about a frequency of 81.25 kilohertz. The output of the cascaded active filter stages 974 is applied to a second amplifier circuit 976 which squares off the SCA modulation into TTL compatible levels. The output from amplifier 976 is applied to the D input of a sampling latch 978.

The stereo pilot signal is applied from stereo pilot filter 878 to pilot input 980 of decoder 876. This pilot signal is routed through an amplifier 982 to convert the sinusoidal waveform into TTL compatible form. The output from amplifier 982 is connected to the clock input of sampling latch 978. Each time the stereo pilot signal on the clock input of latch 978 has a leading, or rising, edge, the data then present at the D input is clocked to the Q output of the latch. By this process, the subcarrier is sampled at every zero-crossing, rising-edge of the pilot signal. The subcarrier state at this instant determines whether the received data bit is 0 or a 1. The Q output of latch 978 is fed through a buffer stage 980 to the packet decoding circuitry 700.

In an alternative embodiment, SCA decoder 876 may be replaced by a phase locked loop decoder (not shown). In such embodiment, a 76 kilohertz reference signal must be applied to the decoder for the phase locked loop to lock on. A frequency multiplier stage (not shown) can be interposed between pilot filter 878 and such a phase locked loop SCA decoder to generate this 76 kilohertz signal directly from the stereo pilot. Some prior art digital SCA systems, in contrast, have noise modulated the SCA carrier to derive a demodulation reference frequency. (Noise modulation is necessary in applications where the data may be constantly on or constantly off.) A phase locked loop is used in such systems to synthesize the carrier frequency from the random modulation. These systems, however, are poorly suited for applications, such as the present one, in which signal-to-noise margins can be low.

In both of the above embodiments of the SCA decoder, the 19 kilohertz stereo pilot signal is used to decode the packet data from the 76 kilohertz subcarrier. This technique yields accurate subcarrier decoding that is not dependent on components within the watch receiver 840. Frequency instability caused by factors such as aging, shock, and temperature variation is thus eliminated. The 76 kilohertz SCA subcarrier transmitted from the FM station and modulated with the packet data is itself locked to this same 19 kilohertz pilot. Thus, any inaccuracies in the SCA subcarrier frequency are tracked by transmitter and receiver alike, assuring accurate demodulation. Use of the unmodulated stereo pilot as a reference for receiving the data from the modulated subcarrier yields a 3 to 4 decibel increase in received signal strength over conventional, noise modulated phase locked loop techniques. These techniques thereby greatly improve the receiver's small signal performance.

4.3 Antenna

The small size and portable nature of the wrist receiver place stringent demands on the receiver's antenna system. For example, the number of stages of RF amplification in the receiver must be kept to a minimum to minimize the drain on its battery. Accordingly, a strong signal must be provided to the receiver from the antenna. However, the signal received by an antenna decreases with its size. The small size and portable nature of the wrist receiver dictates that its antenna be small and unobtrusive, necessarily producing a weak signal.

Such problems are aggravated by the wrist receiver's operating environment. Most FM broadcast receivers are operated with antennas that are mounted tens of feet above ground. The wrist receiver, in contrast, necessarily must use an antenna located near the receiving user, thereby limiting its height to tens of inches. Since the signal intercepted by an antenna decreases as the antenna is moved closer to the ground, the signal received by the wrist radio antenna is further degraded.

Regardless of the antenna geometry selected, the antenna will have reception characteristics, such as a directional pattern and a polarization, that can further hinder operation of the system. For example, loop antennas exhibit a deep null in the plane of the loop. Dipoles and verticals exhibit a deep null off the axis of the conductor. If the wrist receiver antenna is momentarily oriented so that the desired FM signal falls into such a null, the signal and accompanying data are lost. A similar effect occurs if the receiving antenna is momentarily oriented so that its polarization is orthogonal to the polarization of the signal being received. Since even a brief loss of signal destroys the integrity of the received data, it is important that the antenna used with the wrist receiver not have such undesirable reception characteristics.

In the present invention, all of the above problems were overcome by including the person wearing the wrist receiver as part of the effective antenna. A wire loop, forming a closed current loop, around the person's wrist functions as a small loop antenna and also functions to couple electromagnetically the person's limb, and indirectly the person's body, to the receiver as an extension of the antenna. The effective aperture of the antenna is thus markedly increased. Strength of signals received using the person/antenna combination are 2 to 5 decibels greater than the strength of signals using the loop antenna alone. The effects of the necessarily small antenna and its necessarily low height are thus mitigated. Coupling to the body also virtually eliminates the directional characteristics of the loop antenna, yielding a substantially omnidirectional antenna system. Rejection of orthogonally polarized signals by the antenna is also substantially eliminated. The combined person/antenna thus performs much better than the loop antenna by itself, while adding no cost or complexity to the system.

Figure 12A:
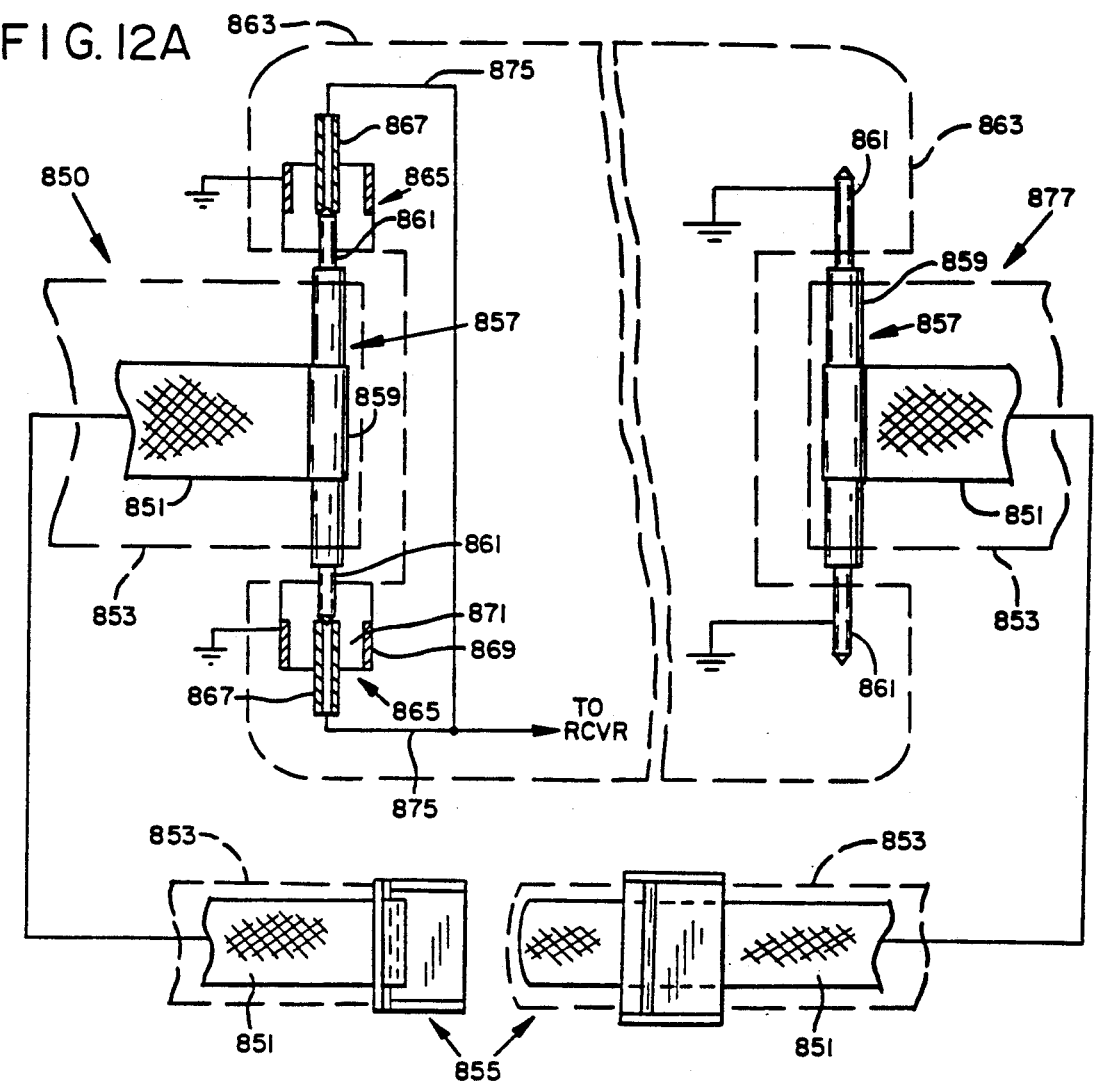
FIG. 12A is a diagram of the watch pager wristband antenna and its connections to the receiver circuit.

In the preferred embodiment, shown in FIG. 12A, loop antenna 850 comprises a strip conductor 851 mounted within a watchband 853. In the illustrated embodiment, the watchband comprises two sections fastened by a conductive clasp assembly 855. Conductor 851 is connected to both elements of clasp assembly 855 so as to form a continuous conductor when the clasp is engaged.

The ends of strip conductor 851 are electrically connected to metal pins 857. Pins 857 each comprise a barrel section 859 and two spring-loaded extension sections 861. Barrel 859 is mechanically fastened to watchband 853. Spring-loaded extensions 861 serve to engage watch case 863 so as to connect watchband 853 to the watch case.

Conducting strip 851 is coupled at one end to the FM subcarrier receiver by insert elements 865 inserted into the watch case. Insert 865 includes a first cylindrical conducting member 867 coaxially disposed within a second cylindrical conducting member 869. Between members 867 and 869 is an insulating sleeve member 871. Members 867 and 869 thus form a capacitor. Outer cylindrical member 869 is electrically connected, by force fit or otherwise, to the surrounding metal watch case 863 which is an RF ground. Spring-loaded extension 861 engages the inner cylindrical conducting member 867 through a small cylindrical passageway through insulator 871. Insert 865 thus forms a shunt capacitive element from strip conductor 851 to the watch case. The value of this capacitance is determined by the size of the inner and outer conducting cylinders 867, 869 and by the dielectric constant of insulating material 871. In the preferred embodiment, each such insert 865 forms a shunt capacitance of approximately 25 picofarads from antenna strip conductor 851 to ground. There being one such insert on each side of the watchband, a total shunt capacitance of 50 picofarads is formed. Wires 875 are bonded to inner cylindrical conducting members 867, joined together and connected to the antenna input of the receiver.

The total 50 picofarad capacitance of inserts 865 was chosen to resonate antenna 850. Strip conductor 851, in its looped configuration, presents an inductive feed point impedance. This inductive reactance is canceled by the aforesaid capacitive elements, thereby producing a substantially resistive feedpoint impedance to the receiver of approximately 100 ohms.

The opposite end 877 of the strip conductor 851 is connected through the spring-loaded extension members 861 directly to the metal watch case 863. This end of conductor 851 is thus grounded, completing the antenna loop.

In alternative embodiments, it may be desirable to resonate antenna 850 by using series capacitive elements, rather than shunt capacitive elements. This may be accomplished by using the insert 865a shown in FIG. 12B. Insert 865a includes a conducting cylindrical member 879 disposed coaxially around inner conducting member 867, but insulated from watch case 863 by a second insulating sleeve member 881. The dielectric material in insulating member 881 is selected to minimize the capacitance between conductor 879 and watch case 863. A wire 883 is bonded to each such cylindrical conductor 879 and is connected to the receiver. In this series fed embodiment, insert 865a is designed to provide a series capacitance of approximately 100 picofarads. Since the watch includes two such inserts, the total effective series capacitance is 50 picofarads. A small inductive element may be inserted in series with the line connecting the receiver to the two inserts 865 so as to more precisely resonate the system.

Figure 12C:
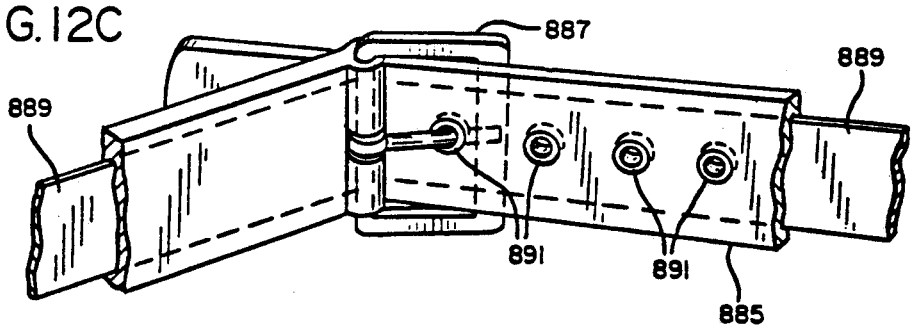
FIG. 12C is a diagram of a linking connection used in a two part watchband of FIG. 12A.
Figure 12B:
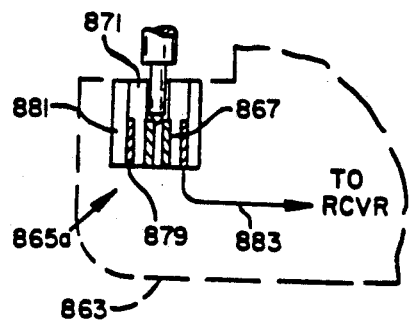
FIG. 12B is a diagram of an alternative embodiment of the receiver antenna and connections of FIG. 12A.

In alternative embodiments, different watchband styles may be employed. One such alternative watchband is shown in FIG. 12C. In such embodiment, the watchband comprises two leather strips 885 connected by a buckle clasp 887. A strip conductor 889 is routed through leather strips 885 and is electrically connected to metal grommets 891 surrounding the holes to which buckle clasp 887 is engaged. Buckle clasp 887 itself is electrically connected to the opposite end of conductor 889 by a conventional metal bond. By this technique, the two sections of the antenna are electrically connected through the metal grommets 891 when buckle clasp 887 is engaged.

Antenna configurations with which the present invention may be used are virtually unlimited. A one piece metal twist-flex watchband, such as shown in FIG. 1A, may be adapted as a receiving antenna by lacing a conductor (not shown) in a zigzag pattern through successive sections of the band. The band is thus allowed to twist and flex without impairing electrical connections of the antenna. In still other embodiments, a short long-wire or a short dipole may be used in lieu of the loop antenna. In still other embodiments, metallization on the face of the watch may be used as the antenna. Such a structure behaves as a small plate antenna and can be fed from any point on the face. The performance of all such antenna structures is dramatically improved by coupling them to the person wearing the wristwatch.

4.4 Reception Reliability

Figure 9C:
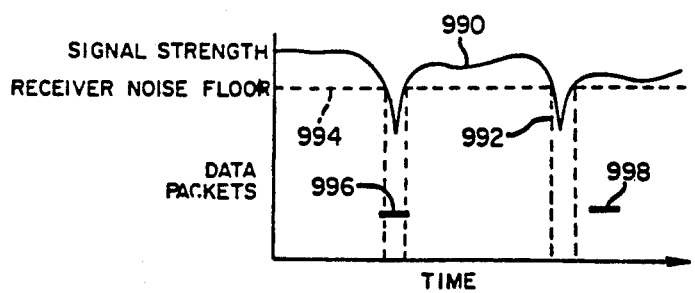
FIG. 9C is a graph of received RF signal strength as the watch pager of FIG. 1A moves.
Figure 9B:
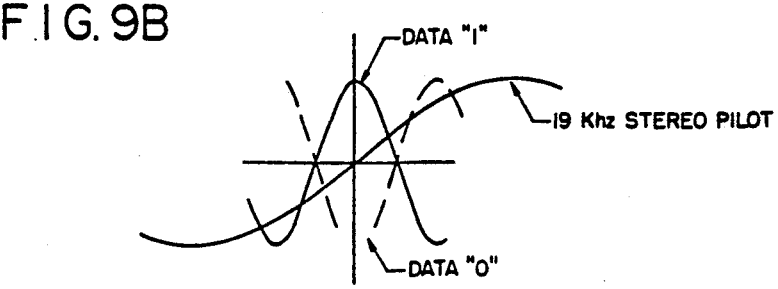

As mentioned above, reliable reception of data signals is a concern in RF paging. The pagers 20 are mobile FM receivers. The transmitted FM signal is characterized by spatial variations in field intensity including nulls due to destructive interference. At FM frequencies, these nulls are typically spaced about 1.5 meters apart and are usually on the order of 0.5 meter in effective length, depending on the level of the receiver noise floor, average field strength and other factors. As the user carries the pager, the FM receiver section passes through the nulls as shown in FIG. 9C. At each null or minima 992, received FM signal 990 can drop below the receiver noise floor 994. This occurs in prior art paging systems as well, such as the American Diversified System. Its effects are minimized in the prior art, however, by using long messages and low baud to minimize the number of bits lost so that error checking and connection can effectively recover the data. In contrast, the present system provides a message packet duration that is much less than the duration of maxima of signal strength between nulls, preferably of the same duration as the nulls or less. A message packet 996 received within a null can be lost but is more likely to be received within a maxima as shown by packet 998. At an automobile speed of 30 meter/second and a transmission rate of 19,000 baud (260 bits/13 milliseconds packet), the packet duration is less than one-half of the maxima. The likelihood of properly receiving a single message packet is thus high, 90% or better, despite the unreliable transmission medium. Throughput reliability is then enhanced by retransmission of message packets at different times and scanning for strong transmission signals.

Having described and illustrated the principles of our invention and preferred embodiments, it should be apparent to those skilled in the art that the invention may be modified in arrangement and detail without departing from such principles. We claim all modifications coming within the scope and spirit of the following claims.

We claim:

1. An antenna apparatus for a radio disposed in a wristwatch case, comprising:
    a wristband formed of first and second band portions each having an antenna conductor with first and second ends;
    fastening means for mechanically fastening said wristband to the wristwatch case, said fastening means including first fastening means for fastening one end of said first band portion to one end of said wristwatch case, and second fastening means for fastening one end of said second band portion to the other end of said wristwatch case so that said case is fastened between said first and second band portions;
    connector means for electrically connecting the first ends of said antenna conductors to said radio; and
    clasp means for mechanically fastening the other ends of said first and second band portions together and for electrically connecting the second ends of said antenna conductors together to form a wrist antenna for said radio,
    wherein the connector means comprises an extensible, conducting pin that engages a first conducting mating member within the watch case, said first mating member being insulated from the watch case and being coupled to the radio and forming a capacitance which tunes the antenna, and said pin being connected to one end of the antenna conductor.

2. An antenna apparatus for a radio disposed in a wristwatch case, comprising:
    a wristband formed of first and second band portions each having an antenna conductor with first and second ends;
    fastening means for mechanically fastening said wristband to the wristwatch case, said fastening means including first fastening means for fastening one end of said first band portion to one end of said wristwatch case, and second fastening means for fastening one end of said second band portion to the other end of said wristwatch case so that said case is fastened between said first and second band portions;
    connector means for electrically connecting the first ends of said antenna conductors to said radio; and
    clasp means for mechanically fastening the other ends of said first and second band portions together and for electrically connecting the second ends of said antenna conductors together to form a wrist antenna for said radio,
    wherein the connector means includes a conducting pin that engages a first conductive member and which also comprises a second conductive member, both of said conductive members being insulated from the watch case and being capacitively coupled to each other, thereby tuning the antenna.

3. The antenna of claim 2 in which said first and second conducting members are coaxially disposed relative to each other.

* * * * *